US010654952B2

(12) United States Patent
Sommazzi et al.

(10) Patent No.: US 10,654,952 B2
(45) Date of Patent: May 19, 2020

(54) NITROGEN TITANIUM COMPLEX, CATALYTIC SYSTEM COMPRISING SAID NITROGEN TITANIUM COMPLEX AND PROCESS FOR THE (CO)POLYMERIZATION OF CONJUGATED DIENES

(71) Applicant: Versalis S.P.A., San Donato Milanese (MI) (IT)

(72) Inventors: Anna Sommazzi, Novara (IT); Guido Pampaloni, Pontedera (IT); Giovanni Ricci, Parma (IT); Francesco Masi, Sant'angelo Lodigiano (IT); Giuseppe Leone, Milan (IT)

(73) Assignee: Versalis S.P.A., San Donato Milanese (IT)

( * ) Notice: Subject to any disclaimer, the term of this patent is extended or adjusted under 35 U.S.C. 154(b) by 112 days.

(21) Appl. No.: 15/741,896

(22) PCT Filed: Jul. 28, 2016

(86) PCT No.: PCT/EP2016/068034
§ 371 (c)(1),
(2) Date: Jan. 4, 2018

(87) PCT Pub. No.: WO2017/017203
PCT Pub. Date: Feb. 2, 2017

(65) Prior Publication Data
US 2018/0201702 A1 Jul. 19, 2018

(30) Foreign Application Priority Data
Jul. 29, 2015 (IT) .................. 102015000039920

(51) Int. Cl.
| | |
|---|---|
| C08F 36/08 | (2006.01) |
| C08F 4/642 | (2006.01) |
| C08F 4/643 | (2006.01) |
| C08F 36/06 | (2006.01) |
| C07F 7/28 | (2006.01) |
| C07F 7/00 | (2006.01) |
| C07D 221/00 | (2006.01) |
| C08F 4/64 | (2006.01) |

(52) U.S. Cl.
CPC .............. *C08F 36/08* (2013.01); *C07F 7/003* (2013.01); *C07F 7/28* (2013.01); *C08F 36/06* (2013.01); *C08F 4/64044* (2013.01); *C08F 4/64048* (2013.01)

(58) Field of Classification Search
USPC .............................. 556/52, 56; 526/161, 172
See application file for complete search history.

(56) References Cited

U.S. PATENT DOCUMENTS 5,041,584 A * 8/1991 Crapo .................. C07F 5/068
526/943
5,128,295 A 7/1992 Porri et al.
5,258,475 A 11/1993 Kissin

FOREIGN PATENT DOCUMENTS

| EP | 277 003 A1 | 1/1988 |
|---|---|---|
| EP | 421 659 A2 | 9/1990 |
| EP | 418044 A2 | 9/1990 |
| EP | 427 697 A2 | 10/1990 |
| EP | 495 375 A2 | 1/1992 |
| EP | 520 732 A1 | 6/1992 |
| WO | WO 92/00333 A2 | 6/1991 |
| WO | WO 92/05208 A1 | 9/1991 |
| WO | WO 2011/061151 A1 | 5/2011 |

OTHER PUBLICATIONS

Long et al, "Living Syndiospecific Polymerization of Propylene Promoted by C1-symmetric Titanium Complexes Activated by Dried MMAO," Journal of Polymer Chemistry Part A: Polymer Chemistry 2012, 50, 638-648. (Year: 2012).*
International Search Report for PCT/EP2016/068034, dated Sep. 27, 2016, 14 pages.
Ping Hu et al: "Syntheses, 1-12 Characterization, and Ethylene Polymerization of Titanium Complexes with Oouble-Outy Tridentate [ONN] Ligands", Organometallics, vol. 31, No. 8, Apr. 23, 2012 (Apr. 23, 2012), pp. 3241-3247.
Miao Hong et al: "Efficient Synthesis of Hydroxylated Polyethylene via Copolymerization of Ethylene with 5-Norbornene-2-methanol using Bis([beta]-enaminoketonato)titanium X X X Catalysts", Organometalli CS, vol. 30, No. 17, Sep. 12, 2011 (Sep. 12, 2011), pp. 4678-4686.
Miao Hong et al: "Synthesis of Polyethylene Containing Allene Groups: A Simple and Efficient Route to Functional Polyethylene", Macromolecular Rapld Communlcat10ns, vol. 33, No. 11, Jun. 14, 2012 (Jun. 14, 2012), pp. 998-1002.
Guofan Yang et al:"Synthesis of Novel Bis([beta]-enaminoketonato)titanium Catalyst with High Activity and Excellent Ability to Copolymerize Olefins", Macromolecular Chemistry Ano Phys1cs., vol. 213, No. 21, Nov. 14, 2012 (Nov. 14, 2012), pp. 2311-2318.
Miao Hong et al: "Preparation of novel cyclic olefin copolymer with high glass transition temperature", Journal of Polymer Sc1ence Part A: Polymer Chem1stry, vol. 51, No. 15, Aug. 1, 2013 (Aug. 1, 2013), pp. 3144-3152.
Xie et al :"Titanium complexes with beta-ketoiminate chelate ligands for ethylene polymerization: The significant influence of substituents on structures and catalytic activities", Inorganic Chemistry Communications, Elsevier, Amsterdam, NL, vol. 12, No. 8, Aug. 1, 2009 (Aug. 1, 2009) , pp. 796-799.
Database CA [Online], Chemical Abstracts Service, Columbus OH, US, 2011, Database Accession No. 2011:1494839.

(Continued)

*Primary Examiner* — Fred M Teskin
(74) *Attorney, Agent, or Firm* — Praedcere Law

(57) ABSTRACT

Disclosed are nitrogen titanium complexes having general formula (I) or (II). Catalytic systems that include the nitrogen titanium complexes and that can be used for the (co) polymerization of conjugated dienes are disclosed. Processes for (co)polymerization of conjugated dienes using the catalytic systems are also disclosed.

10 Claims, 28 Drawing Sheets

(56) References Cited

OTHER PUBLICATIONS

Porri L. et al., "Comprehensive Polymer Science" (1989), Eastmond G. C. et al. Eds., Pergamon Press, Oxford, UK, vol. 4, Part II, p. 53-108.
Horne S. E. et al. in "Industrial & Engineering Chemistry" (1956), vol. 48(4), p. 784-791.
Marconi W. et al., "Journal of Polymer Science Part A: General Papers" (1965), vol. 3(2), p. 735-752.
Cucinella S. et al., "Journal of Macromolecular Science: Part A—Chemistry" (1970), vol. 4, Issue 7, p. 1549-1561.
Oliva L. et al., "Die Makromoleculare Chemie, Rapid Communications" (1990), vol. 11(11), p. 519-524.
Ricci G. et al., "Journal of Organometallic Chemistry" (1993), vol. 451, Issues 1-2, p. 67-72.
Ricci G. et al., "Macromolecular Rapid Communications" (1996), vol. 17, Issue 11, p. 781-785.
Porri L. et al., "Metalorganic Catalyst for Synthesis and Polymerization" (1999), Kaminsky W. Ed., Springer-Verlag Berlin Heidelberg, p. 519-530.
Porri L. et al., "Metallocene-Based Polyolefins" (2000), Scheirs J. et al. Eds., John Wiley & Sons Ltd., p. 115-141.
Ricci G. et al., "Macromolecules" (2001), vol. 34, p. 5766-5769.
Ricci G. et al., "Polymer Bulletin" (2002), vol. 48, p. 25-31.
Bazzini C. et al., "Macromolecular Rapid Communications" (2002), vol. 23, Issue 15, p. 922-927.
Ricci G. et al., "Journal of Molecular Catalysis A: Chemical" (2003), vol. 204-205, p. 287-293.
Bazzini C. et al., "Polymer" (2004), vol. 45, p. 2871-2875.
Pirozzi B. et al., "Macromolecular Chemistry and Physics" (2004), vol. 205, Issue 10, p. 1343-1350.
Ricci G. et al., "Organometallics" (2004), vol. 23(15), p. 3727-3732.
Ricci G. et al., "Journal of Molecular Catalysis A: Chemical" (2005), vol. 226, p. 235-241.
Ricci G. et al., "Macromolecules" (2005), vol. 38, p. 1064-11070.
Ricci G. et al., "Journal of Molecular Catalysis A: Chemical" (2007), vol. 267, Issues 1-2, p. 102-107.
Ricci G. et al., "Macromolecular Symposia" (2008), vol. 260, Issue 1, p. 172-178.
Ricci G. et al., "Macromolecules" (2005), vol. 38, p. 8345-8352.
Ricci G. et al., "Journal of Polymer Science Part A: Polymer Chemistry" (2007), vol. 45, Issue 22, p. 5339-5353.
Ricci G. et al., "Macromolecules" (2007), vol. 40, p. 7238-7243.
Pirozzi B. et al., "Macromolecules" (2007), vol. 40, p. 8962-8968.
Ricci G. et al., "Macromolecules" (2009), vol. 42, p. 3048-3056.
Porri L. et al., "Progress in Polymer Science" (1991), vol. 16, p. 405-441.
Porri L. et al., "Makromolekulare Chemie. Macromolecular Symposia" (1991), vol. 48-49, Issue 1, p. 239-252.
Porri L. et al., "Polymer Science, Ser. A" (1994), vol. 36, p. 1421-1432.
Porri L. et al., "Macromolecular Symposia" (2002), vol. 178, Issue 1, p. 55-68.
Wu J. et al., "Journal of American Chemistry Society" (2009), vol. 131(36), p. 12915-12917.
Laine V. T. et al., "European Journal of Inorganic Chemistry" (1999), vol. 6, p. 959-964.
Bianchini C. et al., "New Journal of Chemistry" (2002), vol. 26(4), p. 387-397.
Lai Yi-C. et al., "Tetrahedron" (2005), vol. 61(40), p. 9484-9489.
Nienkemper K. et al., "Journal of Organometallic Chemistry" (2008), vol. 693(8-9), p. 1572-1589.
Lin Y. et al., "Dalton Transactions" (2012), vol. 41(22), p. 6661-6670.
Patil S. A. in "Synthetic Communications" (2013), vol. 43, Issue 7, p. 2349-2364.
Zhang Z.-H. In "Advanced Synthesis & Catalysis" (2006), Issue 1-2, p. 184-190.
Johnson L. K. et al., "Journal of the American Chemical Society" (1995), vol. 117, p. 6414-641.
Van Koten G. et al., "Advances in Organometallic Chemistry" (1982), vol. 21, p. 151-239.
Ricci G. et al., "Advances in Organometallic Chemistry Research" (2007), Yamamoto K. Ed., Nova Science Publisher, Inc., USA, p. 1-36.
Ricci G. et al., "Coordination Chemistry Reviews" (2010), vol. 254, p. 661-676.
Ricci G. et al., "Ferrocenes: Compounds, Properties and Applications" (2011), Elisabeth S. Phillips Ed., Nova Science Publisher, Inc., USA, p. 273-313.
Ricci G. et al., "Chromium: Environmental, Medical and Material Studies" (2011), Margaret P. Salden Ed., Nova Science Publisher, Inc., USA, p. 121-1406.
Ricci G. et al., "Cobalt: Characteristics, Compounds, and Applications" (2011), Lucas J. Vidmar Ed., Nova Science Publisher, Inc., USA, p. 39-81.
Ricci G. et al., "Phosphorus: Properties, Health effects and Environment" (2012), Ming Yue Chen and Da-Xia Yang Eds., Nova Science Publisher, Inc., USA, p. 53-94.
"IUPAC Periodic Table of the Elements", version dated May 1, 2013, available on the following website: www.iupac.org/fileadmin/user_upload/news/IUPAC_Periodic_Table-1Jun12.pdf.
Beck et al., "Chemical Reviews" (1988), vol. 88, p. 1405-1421.
Stares et al, "Chemical Reviews" (1993), vol. 93, p. 927-942.
Ricci G, et al, "Journal of Organometallic Chemistry" (2005), VI. 690, p. 1845-1854.

* cited by examiner

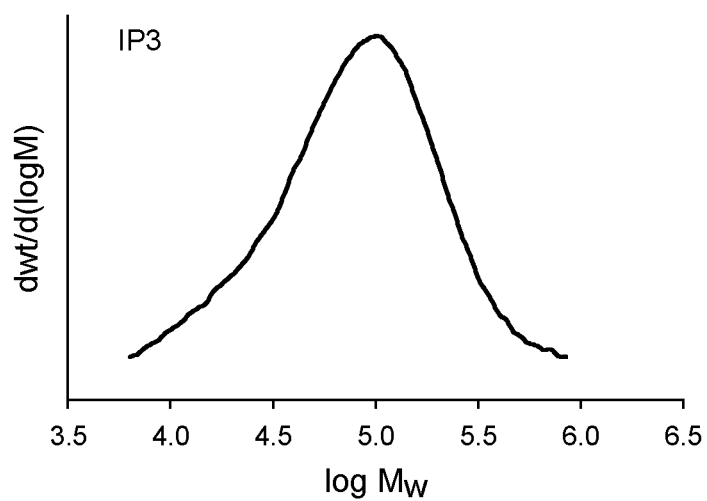
FIGURE 24
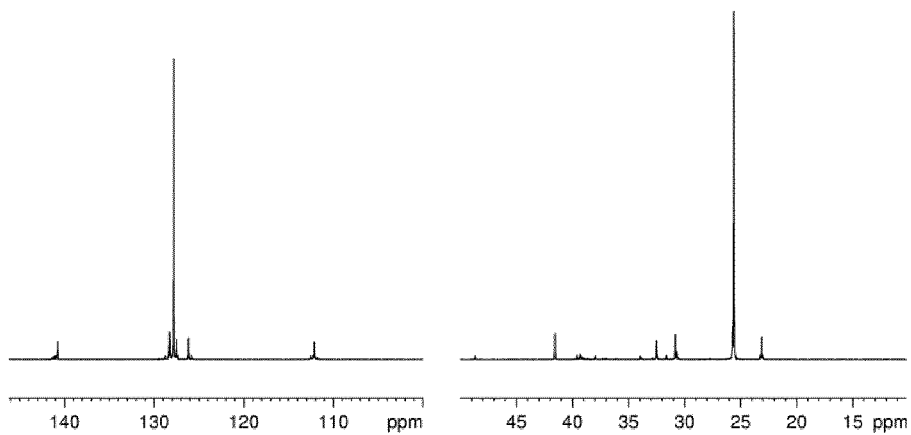

NITROGEN TITANIUM COMPLEX, CATALYTIC SYSTEM COMPRISING SAID NITROGEN TITANIUM COMPLEX AND PROCESS FOR THE (CO)POLYMERIZATION OF CONJUGATED DIENES

The present invention relates to a nitrogen titanium complex.

More particularly, the present invention relates to a nitrogen titanium complex and its use in a catalytic system for the (co)polymerization of conjugated dienes.

The present invention also relates to a catalytic system for the (co)polymerization of conjugated dienes comprising said nitrogen titanium complex.

Furthermore, the present invention relates to a (co)polymerization process of conjugated dienes, in particular, a process for the polymerization of 1-3-butadiene or isoprene, characterized in that it uses said catalytic system.

It is known that the stereospecific (co)polymerization of conjugated dienes is a very important process in the chemical industry in order to obtain products that are among the most widely used rubbers.

Stereospecific polymerization of conjugated dienes with catalytic systems based on transition metals began in 1954, straight after the first results obtained in the polymerization of propylene as reported, for example, in Porri L. et al., "Comprehensive Polymer Science" (1989), Eastmond G. C. et al. Eds., Pergamon Press, Oxford, UK, Vol. 4, Part II, pg. 53-108. The first catalytic systems used were obtained by combining titanium tetrachloride ($TiCl_4$) or titanium(III) chloride ($TiCl_3$) with aluminum-alkyls, or catalytic systems previously used for the polymerization of ethylene or propylene.

The first stereoregular diene polymer synthesized was polyisoprene having a very similar structure to that of natural rubber (i.e. 1,4-cis structure) described by Horne S. E. et al. in "Industrial & Engineering Chemistry" (1956), Vol. 48(4), pg. 784-791, immediately followed by the polyisoprene with similar structure as that of gutta-percha (i.e. 1,4-trans structure) described by Natta G. et al. in "Chemical Abstract" (1959), Vol. 53, pg. 3756 and in Italian patent application IT 536631.

In particular, the titanium(IV)chloride/trialkylaluminum ($TiCl_4/Al(R)_3$) catalytic system wherein R may be, for example, methyl, ethyl, iso-butyl, cyclohexyl), was the first catalyst used for the polymerization of 1,3-butadiene, as described, for example, in: Porri L. et al., "Comprehensive Polymer Science" (1989), Eastmond G. C. et al. Eds., Pergamon Press, Oxford, UK, Vol. 4, Part II, pg. 53-108, reported above; Horne S. E. et al., "Industrial Engineering Chemistry" (1956), Vol. 48, pg. 784-791, reported above. According to the Al/Ti molar ratio, polybutadienes can be obtained prevalently with a 1,4-cis structure (i.e. content of 1,4-cis units equal to 65%-70%), or polybutadienes with a mixed 1,4-cis/1,4-trans structure.

Polybutadienes having a higher content of 1,4-cis units, equal to about 92%-95%, have been obtained by combining various types of aluminum alkyl compounds such as, for example, compounds having formula $Al(R)_3$ wherein R may be, for example, methyl, ethyl, iso-butyl, cyclohexyl, preferably tri-iso-butyl-aluminum [$Al(^iBu)_3$], with titanium based catalysts containing iodine [e.g., titanium(IV)iodide ($TiI_4$), titanium dichlorodiiodide ($TiCl_2I_2$), titanium trichloroiodide ($TiCl_3I$)] as described, for example, in: Porri L. et al., "Comprehensive Polymer Science" (1989), Eastmond G. C. et al. Eds., Pergamon Press, Oxford, UK, Vol. 4, Part II, pg. 53-108, reported above; Cooper W. et al., "The Stereo Rubbers" (1997), W. M. Saltman Ed., Wiley, New York, pg. 21; Marconi W. et al., "La Chimica e l'Industria" (1963), Vol. 45, pg. 522-528; or using catalytic systems comprising catalysts based on titanium tetrachloride ($TiCl_4$), aluminum triiodide ($AlI_3$) and aluminum hydrides, as described, for example, in Marconi W. et al., "Journal of Polymer Science Part A: General Papers" (1965), Vol. 3(2), pg. 735-752.

Catalytic systems based on titanium were the first to be used for the synthesis of polybutadiene with a high content of 1,4-cis units, and represented the basis for the development of the processes used industrially for said synthesis both in Europe and the USA. Nowadays more active and stereospecific catalytic systems are available, based on other metals such as, for example, cobalt (Co), nickel (Ni) and neodymium (Nd).

However, by appropriately changing the catalytic formulation, catalytic systems based on titanium are able to provide polybutadiene with a 1,2 structure and 1,4-trans structure. For example, the catalytic system α-titanium(III) trichloride/triethylaluminum ($\alpha$-$TiCl_3$/$AlEt_3$) was the first catalyst used for the preparation of polybutadiene 1,4-trans as described, for example, in Porri L. et al., "Comprehensive Polymer Science" (1989), Eastmond G. C. et al. Eds., Pergamon Press, Oxford, UK, Vol. 4, Part II, pg. 53-108, reported above; Natta G. et al., "Chemical Abstract" (1959), Vol. 53, pg. 3756 and in Italian patent application IT 536631; reported above. Other titanium based catalytic systems are reported, for example, in: Cucinella S. et al., "Journal of Macromolecular Science: Part A—Chemistry" (1970), Vol. 4, Issue 7, pg. 1549-1561; Natta G. et al., "Chemical Abstract" (1958), Vol. 52, pg. 5032 and in Italian patent application IT 538453; Mazzei S. et al., "La Chimica e l'Industria" (1963), Vol. 45, pg. 528 e in "Chemical Abstract" (1963), Vol. 59, pg. 4043; Oliva L. et al., "Die Makromoleculare Chemie, Rapid Communications" (1990), Vol. 11(11), pg. 519-524; Ricci G. et al., "Journal of Organometallic Chemistry" (1993), Vol. 451, Issues 1-2, pg. 67-72; Ricci G. et al., "Macromolecular Rapid Communications" (1996), Vol. 17, Issue 11, pg. 781-785; Porri L. et al., "Metalorganic Catalyst for Synthesis and Polymerization" (1999), Kaminsky W. Ed., Springer-Verlag Berlin Heidelberg, pg. 519-530; Porri L. et al., "Metallocene-Based Polyolefins" (2000), Scheirs J. et al. Eds., John Wiley & Sons Ltd., pg. 115-141.

Over recent years, in the wake of what happened in the case of monoolefins, a new generation of catalysts has been introduced, based on transition metal complexes, in particular, chromium (Cr), iron (Fe) and cobalt (Co) with ligands containing donor atoms such as phosphorus (P), nitrogen (N), oxygen (O) (for example, mono- and bi-dentate phosphines, bis-imine, imino pyridine, ketoimine), which have been used in combination with methylaluminoxane (MAO) for providing catalytic systems that have shown to be particularly active and able to provide diene polymers with a controlled microstructure (i.e. 1,4-cis-1,4; 1,2; mixed structure 1,4-cis/1,2 with a variable content of 1,2 units). Further details on said catalytic systems can be found, for example, in: Ricci G. et al., "Macromolecules" (2001), Vol. 34, pg. 5766-5769; Ricci G. et al., "Polymer Bulletin" (2002), Vol. 48, pg. 25-31; Bazzini C. et al., "Macromolecular Rapid Communications" (2002), Vol. 23, Issue 15, pg. 922-927; Ricci G. et al., "Journal of Molecular Catalysis A: Chemical" (2003), Vol. 204-205, pg. 287-293; Bazzini C. et al., "Polymer" (2004), Vol. 45, pg. 2871-2875; Pirozzi B. et al., "Macromolecular Chemistry and Physics" (2004), Vol. 205, Issue 10, pg. 1343-1350; Ricci G. et al., "Organometallics" (2004), Vol. 23(15), pg. 3727-3732; Ricci G. et al., "*Journal of Molecular Catalysis A: Chemical*" (2005), Vol. 226, pg. 235-241; Ricci G. et al., "*Macromolecules*" (2005), Vol. 38, pg. 1064-11070; Ricci G. et al., "*Journal of Organometallic Chemistry*" (2005), Vol. 690, pg. 1845-1854; Ricci G. et al., "*Journal of Molecular Catalysis A: Chemical*" (2007), Vol. 267, Issues 1-2, pg. 102-107; Ricci G. et al., "*Macromolecular Symposia*" (2008), Vol. 260, Issue 1, pg. 172-178.

The same catalytic systems also have allowed to synthesize new stereoregular diene polymers starting from different monomers such as isoprene, 1,3-pentadiene, 1,3-hexadiene, 3-methyl-1,3-pentadiene, 1,3-heptadiene,1,3-octadiene and 5-methyl-1,3-hexadiene as reported, for example, in: Ricci G. et al., "*Macromolecules*" (2005), Vol. 38, pg. 8345-8352; Ricci G. et al., "*Journal of Polymer Science Part A: Polymer Chemistry*" (2007), Vol. 45, Issue 22, pg. 5339-5353; Ricci G. et al., "*Macromolecules*" (2007), Vol. 40, pg. 7238-7243; Pirozzi B. et al., "*Macromolecules*" (2007), Vol. 40, pg. 8962-8968; Ricci G. et al., "*Macromolecules*" (2009), Vol. 42, pg. 3048-3056. This enabled new links to be established between the structure of the catalyst, the structure of the monomer and the microstructure of the polymer, at the same time enabling the level of knowledge to be increased on the polymerization mechanism of conjugated dienes already known in the prior art and reported, for example, in: Porri L. et al., "*Comprehensive Polymer Science*" (1989), Eastmond G. C. et al. Eds., Pergamon Press, Oxford, UK, Vol. 4, Part II, pg. 53-108, reported above; Porri L., "*Structural Order in Polymers*" (1981), Ciardelli F. et al. Eds., Pergamon Press, Oxford, UK, pg. 51; Porri L. et al., "*Progress in Polymer Science*" (1991), Vol. 16, pg. 405-441; Porri L. et al., "*Makromolekulare Chemie. Macromolecular Symposia*" (1991), Vol. 48-49, Issue 1, pg. 239-252; Porri L. et al., "*Polymer Science, Ser. A*" (1994), Vol. 36, pg. 1421-1432; Porri L. et al., "*Macromolecular Symposia*" (2002), Vol. 178, Issue 1, pg. 55-68.

Since (co)polymers of conjugated dienes, in particular polybutadiene with a prevalent 1,4-cis unit content, (i.e. 1,4-cis unit content ≥80%) which can be advantageously used for producing tyres, in particular for tire treads, and polyisoprene with a prevalent 1,4-cis/3,4 unit content (i.e. 1,4-cis unit content ranging from 30% to 60% and a 3,4 unit content ranging from 40% to 70%) which can be advantageously used in the footwear industry (e.g., for producing soles for shoes), studying new catalytic systems able to provide said (co)polymers is still of great interest.

The Applicant set out to solve the problem of finding a new nitrogen titanium complex to be used in a catalytic system able to give (co)polymers of conjugated dienes such as, for example, polybutadiene with a prevalent 1,4-cis unit content (i.e. 1,4-cis unit content ≥80%), or polyisoprene with a variable 1,4-cis/3,4 unit content (i.e. 1,4-cis unit content ranging from 30% to 60% and a 3,4 unit content ranging from 40% to 70%).

The Applicant has now found a new nitrogen titanium complex having general formula (I) or (II) defined below, able to give (co)polymers of conjugated dienes such as, for example, polybutadiene with a prevalent 1,4-cis unit content (i.e. 1,4-cis unit content ≥80%), or polyisoprene with a variable 1,4-cis/3,4 unit content (i.e. 1,4-cis unit content ranging from 30% to 60% and a 3,4 unit content ranging from 40% to 70%).

Therefore, the subject matter of the present invention is a nitrogen titanium complex having general formula (I) or (II):

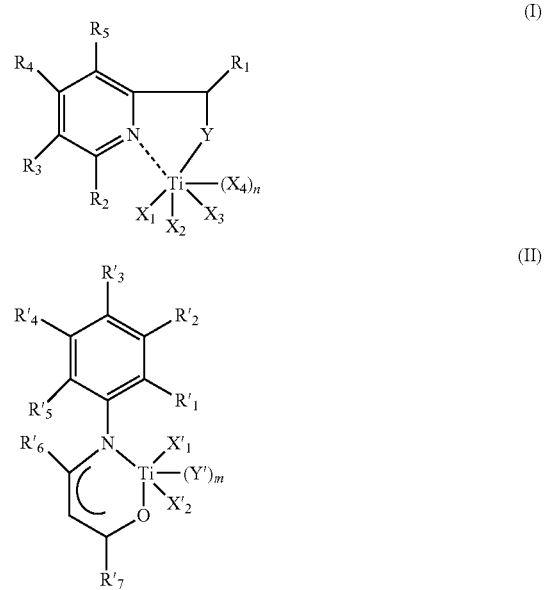

wherein:
R$_1$ represents a hydrogen atom; or is selected from linear or branched C$_1$-C$_{20}$ alkyl groups, preferably C$_1$-C$_{15}$, optionally halogenated, cycloalkyl groups optionally substituted, aryl groups optionally substituted;
R$_2$, R$_3$, R$_4$ and R$_5$, identical or different, represent a hydrogen atom; or are selected from linear or branched C$_1$-C$_{20}$ alkyl groups, preferably C$_1$-C$_{15}$, optionally halogenated, cycloalkyl groups optionally substituted, aryl groups optionally substituted, nitro groups, hydroxyl groups, amino groups;
Y represents a NH—R$_6$ group wherein R$_6$ represents a hydrogen atom, or is selected from linear or branched C$_1$-C$_{20}$ alkyl groups, preferably C$_1$-C$_{15}$, optionally halogenated, cycloalkyl groups optionally substituted, aryl groups optionally substituted; or a N—R$_7$ group wherein R$_7$ is selected from linear or branched C$_1$-C$_{20}$ alkyl groups, preferably C$_1$-C$_{15}$, optionally halogenated, cycloalkyl groups optionally substituted, aryl groups optionally substituted;
X$_1$, X$_2$, X$_3$ and X$_4$, identical or different, represent a halogen atom such as, for example, chlorine, bromine, iodine, preferably chlorine; or are selected from linear or branched C$_1$-C$_{20}$ alkyl groups, preferably C$_1$-C$_{15}$, —OCOR$_8$ or —OR$_8$ groups wherein R$_8$ is selected from linear or branched C$_1$-C$_{20}$ alkyl groups, preferably C$_1$-C$_5$; or one of X$_1$, X$_2$ and X$_3$, is selected from ethers, such as, for example, diethylether, tetrahydrofuran (THF), dimethoxyethane, preferably is tetrahydrofuran (THF);
n is 1 in the case wherein Y represents a NH—R$_6$ group wherein R$_6$ has the same meanings reported above; or is 0 in the case wherein Y represents a N—R$_7$ group wherein R$_7$ has the same meanings reported above, or in the case wherein one of X$_1$, X$_2$ and X$_3$, is selected from ethers;
R'$_1$, R'$_2$, R'$_3$, R'$_4$, R'$_5$, R'$_6$ and R'$_7$, identical or different, represent a hydrogen atom; or are selected from linear or branched C$_1$-C$_{20}$ alkyl groups, preferably C$_1$-C$_5$, optionally halogenated, cycloalkyl groups optionally substituted, aryl groups optionally substituted;

X'₁ and X'₂, identical or different, represent a halogen atom such as, for example, chlorine, bromine, iodine, preferably chlorine; or are selected from linear or branched $C_1$-$C_{20}$ alkyl groups, preferably $C_1$-$C_{15}$, —OCOR'₈ groups or —OR'₈ groups wherein R'₈ is selected from linear or branched $C_1$-$C_{20}$ alkyl groups, preferably $C_1$-$C_{15}$;

Y' is selected from ethers such as, for example, diethylether, tetrahydrofuran (THF), dimethoxyethane, preferably tetrahydrofuran (THF); or Y' represents a group having general formula (III):

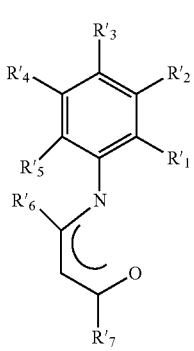

(III)

wherein R'₁, R'₂, R'₃, R'₄, R'₅, R'₆, and R'₇, have the same meanings as reported above;

m is 0 or 1.

A description of the drawings is as follows:

FIG. 24 shows the GPC diagram of the polybutadiene obtained in Example 27.

Figure 1:
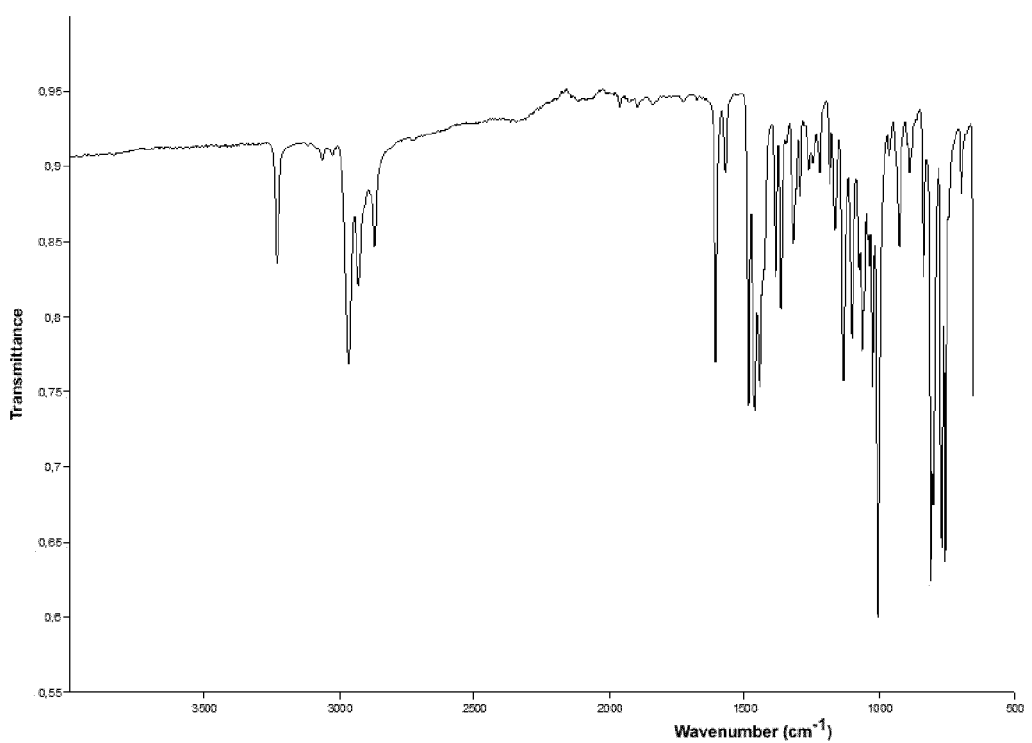
FIG. 1 shows the FT-IR spectrum (solid state—ATR) of the complex TiCl₄(L2) obtained in Example 9.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of". The term "$C_1$-$C_{20}$ alkyl groups" means alkyl groups having from 1 to 20 carbon atoms, linear or branched. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "optionally halogenated $C_1$-$C_{20}$ alkyl groups" means alkyl groups having from 1 to 20 carbon atoms, linear or branched, saturated or unsaturated, wherein at least one of the hydrogen atoms is substituted with a halogen atom such as, for example, fluorine, chlorine, bromine, preferably fluorine, chlorine. Specific examples of $C_1$-$C_{20}$ alkyl groups optionally halogenated are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluoroctyl, perfluorodecyl.

The term "cycloalkyl groups" means cycloalkyl groups having from 3 to 30 carbon atoms. Said cycloalkyl groups can be optionally substituted with one or more groups, identical or different, selected from: halogen atoms such as, for example, fluorine, chlorine, bromine, preferably fluorine, chlorine; hydroxyl groups, $C_1$-$C_{12}$ alkyl groups; $C_1$-$C_{12}$ hydroxyl groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

The term "aryl groups" means carbocyclic aromatic groups. Said aryl groups can be optionally substituted with one or more groups, identical or different, selected from: halogen atoms such as, for example, fluorine, chlorine, bromine; hydroxyl groups, $C_1$-$C_{12}$ alkyl groups; $C_1$-$C_{12}$ hydroxyl groups; cyano groups; amino groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

In accordance with a preferred embodiment of the present invention, in said nitrogen titanium complex having general formula (I) or (II):

$R_1$ represents a hydrogen atom; or is selected from $C_1$-$C_{20}$ alkyl groups, preferably is methyl;

$R_2$, $R_3$, $R_4$ and $R_5$, mutually identical, represent a hydrogen atom;

Y represents a NH—$R_6$ group or a N—$R_7$ group wherein $R_6$ and $R_7$ are selected from aryl groups optionally substituted; preferably are phenyl, or phenyl substituted with one or more methyl, iso-propyl, tert-butyl groups;

$X_1$, $X_2$, $X_3$ and $X_4$, identical or different, represent a halogen atom, such as, for example, chlorine, bromine, iodine, preferably chlorine; or one of $X_1$, $X_2$, $X_3$ is tetrahydrofuran (THF);

n is 1 in the case wherein Y represents a NH—$R_6$ group wherein $R_6$ has the same meanings reported above; or it is 0 in the case wherein Y represents a N—$R_7$ group wherein $R_7$ has the same meanings reported above, or in the case wherein Y represents a N—$R_7$ group wherein $R_7$ has the same meanings reported above and one of $X_1$, $X_2$ and $X_3$, is tetrahydrofuran;

$R'_1$, $R'_2$, $R'_3$, $R'_4$ and $R'_5$, mutually identical, represent a hydrogen atom; or are selected from $C_1$-$C_{20}$, alkyl groups, preferably are methyl;

$R'_6$ and $R'_7$, mutually identical, are selected from linear or branched $C_1$-$C_{20}$ alkyl groups, preferably $C_1$-$C_{15}$, preferably are methyl;

$X'_1$ and $X'_2$, mutually identical, represent a halogen atom such as, for example, chlorine, bromine, iodine, preferably chlorine;

Y' is tetrahydrofuran, or represents a group having general formula (III):

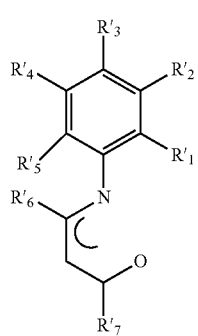

(III)

wherein $R'_1$, $R'_2$, $R'_3$, $R'_4$, $R'_5$, $R'_6$, and $R'_7$, have the same meanings as reported above;

m is 0 or 1.

The nitrogen titanium complex having general formula (I) or (II) can be considered, in accordance with the present invention, under any physical form such as, for example, the isolated and purified solid form, the form solvated with an appropriate solvent, or the one supported on suitable organic or inorganic solids, preferably having a granular or powdered physical form.

The nitrogen titanium complex having general formula (I) is prepared starting from ligands known in the prior art.

Specific examples of ligands useful for the purpose of the present invention are those having the following formulae (L1)-(L5):

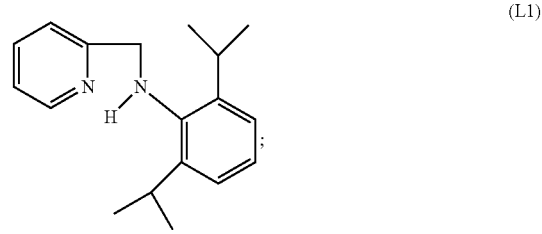 [SMILES: CC(C)c1cccc(C(C)C)c1NCc1ccccn1]

(L1)

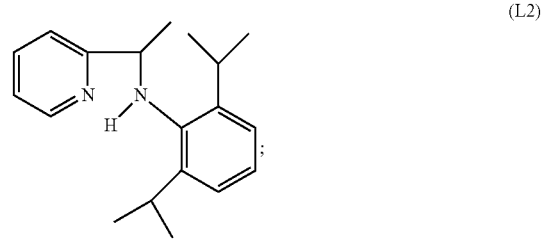 [SMILES: CC(C)c1cccc(C(C)C)c1NC(C)c1ccccn1]

(L2)

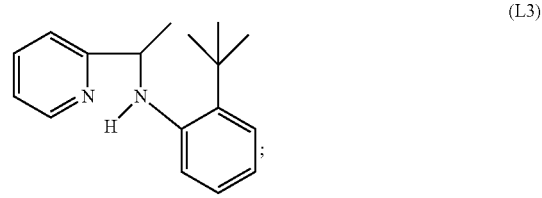 [SMILES: CC(Nc1ccccc1C(C)(C)C)c1ccccn1]

(L3)

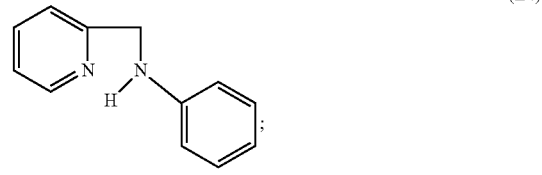

(L4)

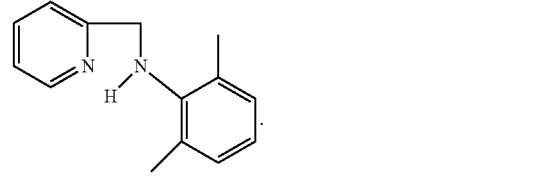

(L5)

Said ligands having formulae (L1)-(L5), can be prepared through processes known in the prior art. For example, said ligands having formulae (L1)-(L5), can be prepared through a process comprising: (1) condensation reactions between an appropriate aniline and 2-pyridinecarboxyaldehyde or 2-acetylpyridine, with formation of the corresponding imine as described, for example, in: Wu J. et al., "*Journal of American Chemistry Society*" (2009), Vol. 131(36), pg.

12915-12917; Laine V. T. et al., "*European Journal of Inorganic Chemistry*" (1999), Vol. 6, pg. 959-964; Bianchini C. et al., "*New Journal of Chemistry*" (2002), Vol. 26(4), pg. 387-397; Lai Yi-C. et al., "*Tetrahedron*" (2005), Vol. 61(40), pg. 9484-9489; (2) transformation of the synthesized imine into the corresponding amine as described, for example, in: Nienkemper K. et al., "*Journal of Organometallic Chemistry*" (2008), Vol. 693(8-9), pg. 1572-1589; Lin Y. et al., "*Dalton Transactions*" (2012), Vol. 41(22), pg. 6661-6670.

The nitrogen titanium complex having general formula (I) may be prepared according to processes known in the prior art. For example, said nitrogen titanium compound may be prepared by reaction between titanium compounds having general formula Ti(X)$_4$ wherein X is a halogen atom such as, for example, chlorine, bromine, iodine, preferably chlorine, as such or complexed with ethers [for example, diethylether, tetrahydrofuran (THF), dimethoxyethane], with the ligands having formulae (L1)-(L5) reported above, said ligands being used in stoichiometric quantities, operating, preferably, in the presence of at least one solvent that may be selected, for example, from: chlorinated solvents (for example, dichloromethane, ether solvents, [for example, tetrahydrofuran (THF)], hydrocarbon solvents (for example, heptane, toluene), or mixtures thereof, at a temperature ranging from 25° C. to 110° C., preferably at the solvent reflux temperature. Or, in the case wherein Y represents a N—R$_7$ group wherein R$_7$ has the same meanings as reported above, said ligands, before being made to react with the aforementioned titanium compounds, can be made to react with an alkyl-lithium such as, for example, lithium n-butyl (n-BuLi), obtaining a salt of said ligands which is subsequently made to react with the aforementioned titanium compounds operating as described above. The nitrogen titanium complex thus obtained can be subsequently recovered through methods of the prior art such as, for example, precipitation through a non-solvent (for example, hexane, heptane), followed by separation through filtration or decantation and any subsequent solubilization in an appropriate solvent followed by crystallization at a low temperature.

The nitrogen titanium complex having general formula (II) is prepared starting from ligands known in the prior art.

Specific examples of ligands useful for the purpose of the present invention are those having the following formulae (L6)-(L8):

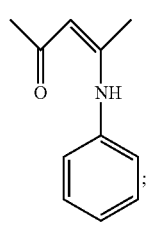

(L6)

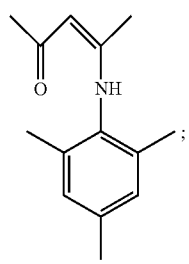

(L7)

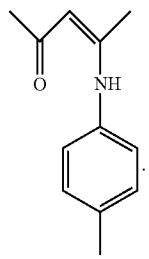

(L8)

Said ligands having formulae (L6)-(L8), can be prepared through processes known in the prior art. For example, said ligands having formulae (L6)-(L8) can be prepared through condensation reactions between β-diketones with aniline, in the presence of formic acid in catalytic quantity, as described, for example, by Patil S. A. in "*Synthetic Communications*" (2013), Vol. 43, Issue 7, pag. 2349-2364; or by reaction of β-dicarbonyl compounds with amines, in the presence of indium tribromide in catalytic quantity, as described, for example, by Zhang Z.-H. in "*Advanced Synthesis & Catalysis*" (2006), Issue 1-2, pag. 184-190.

The nitrogen titanium complex having general formula (II) may be prepared according to processes known in the prior art. For example, said nitrogen titanium compound may be prepared by reaction between titanium compounds having general formula Ti(X)$_3$ wherein Ti is titanium and X is a halogen atom such as, for example, chlorine, bromine, iodine, preferably chlorine, as such or complexed with ethers [for example, diethylether, tetrahydrofuran (THF), dimethoxyethane], preferably complexed with tetrahydrofuran (THF), with the ligands having formulae (L6)-(L8) reported above, in molar ratio ligand (L)/titanium (Ti) ranging from 1 to 1.5 operating, preferably, in the presence of at least one solvent which can be selected, for example, from: chlorinated solvents (for example, dichloromethane, ether solvents, [for example, tetrahydrofuran (THF)], alcoholic solvents (for example, butanol), hydrocarbon solvents (for example, toluene), or mixtures thereof, at room temperature or higher. Preferably, said ligands, before being made to react with the aforementioned titanium compounds, can be made to react with an alkyl-lithium such as, for example, n-butyl lithium (n-BuLi), obtaining a salt of said ligands which is subsequently made to react with the aforementioned titanium compounds operating as described above. The nitrogen titanium complex thus obtained can be subsequently recovered through methods of the prior art, for example, precipitation through a nonsolvent (e.g. hexane, heptane), followed by separation through filtration or decantation and any subsequent solubilization in an appropriate solvent followed by crystallization at a low temperature.

For the purpose of the present description and of the following claims the expression "room temperature" means a temperature ranging from 20° C. to 25° C.

As mentioned above, the present invention also relates to a catalytic system for the (co)polymerization of conjugated dienes comprising said nitrogen titanium complex having general formula (I) or (II).

Therefore, the present invention also relates to a catalytic system for the (co)polymerization of conjugated dienes comprising:
(a) at least one nitrogen titanium complex having general formula (I) or (II);
(b) at least one co-catalyst selected from organic compounds of an element M' different from carbon, said element M' being selected from elements belonging to groups 2, 12, 13, or 14, of the Periodic Table of the Elements, preferably from: boron, aluminum, zinc, magnesium, gallium, tin, more preferably from aluminum, boron.

In general, the formation of the catalytic system comprising the nitrogen titanium complex having general formula (I) or (II) and the co-catalyst (b), is preferably carried out in an inert liquid medium, more preferably in a hydrocarbon solvent. The choice of the nitrogen titanium complex having general formula (I) or (II) and of the co-catalyst (b), as well as the particular methodology used, may vary according to the molecular structures and to the desired result, according to what is similarly reported in relevant literature accessible to an expert skilled in the art:

for other transition metal complexes with imine ligands, in the case of the nitrogen titanium complex having general formula (I), as, for example, reported in: Johnson L. K. et al., "*Journal of the American Chemical Society*" (1995), Vol. 117, pg. 6414-641; van Koten G. et al., "*Advances in Organometallic Chemistry*" (1982), Vol. 21, pg. 151-239;

for other transition metal complexes with ligands of various kinds, in the case of the nitrogen titanium complex having general formula (II), as, for example, reported in: Ricci G. et al., "*Advances in Organometallic Chemistry Research*" (2007), Yamamoto K. Ed., Nova Science Publisher, Inc., USA, pg. 1-36; Ricci G. et al., "*Coordination Chemistry Reviews*" (2010), Vol. 254, pg. 661-676; Ricci G. et al., "*Ferrocenes: Compounds, Properties and Applications*" (2011), Elisabeth S. Phillips Ed., Nova Science Publisher, Inc., USA, pg. 273-313; Ricci G. et al., "*Chromium: Environmental, Medical and Material Studies*" (2011), Margaret P. Salden Ed., Nova Science Publisher, Inc., USA, pg. 121-1406; Ricci G. et al., "*Cobalt: Characteristics, Compounds, and Applications*" (2011), Lucas J. Vidmar Ed., Nova Science Publisher, Inc., USA, pg. 39-81; Ricci G. et al., "*Phosphorus: Properties, Health effects and Environment*" (2012), Ming Yue Chen and Da-Xia Yang Eds., Nova Science Publisher, Inc., USA, pg. 53-94.

In accordance with a further preferred embodiment of the present invention, said co-catalyst (b) can be selected from (b₁) aluminum alkyls having general formula (IV):

$$Al(X_a)_n(R_a)_{3-p} \qquad (IV)$$

wherein $X_a$ represents a halogen atom such as, for example, chlorine, bromine, iodine, fluorine; $R_a$ is selected from linear or branched $C_1$-$C_{20}$ alkyl groups, cycloalkyl groups, aryl groups, said groups being optionally substituted with one or more atoms of silicon or germanium; and p is an integer ranging from 0 to 2.

In accordance with a further preferred embodiment of the present invention, said co-catalyst (b) can be selected from (b₂) organo-oxygenated compounds of an element M' different from carbon belonging to groups 13 or 14 of the Periodic Table of the Elements, preferably organo-oxygenated compounds of aluminum, gallium, tin. Said organo-oxygenated compounds (b₂) can be defined as organic compounds of M', wherein the latter is bonded to at least one oxygen atom and to at least one organic group comprising an alkyl group having from 1 to 6 carbon atoms, preferably methyl.

In accordance with a further preferred embodiment of the present invention, said co-catalyst (b) can be selected from (b₃) compounds or mixtures of organometallic compounds of an element M' different from carbon able to react with the nitrogen titanium complex having general formula (I) or (II) by extracting from it a σ-linked substituent $X_1$, $X_2$, $X_3$ or $X_4$, to form on the one hand at least one neutral compound and, on the other hand, an ionic compound consisting of a cation containing the metal (Ti) coordinated by the ligand, and a non-coordinating organic anion containing the metal M', whose negative charge is delocalized on a multicenter structure.

It has to be noted that for the purpose of the present invention and of the the following claims, the term "Periodic Table of the Elements" refers to the "IUPAC Periodic Table of the Elements", version dated 1 May 2013, available on the following website: www.iupac.org/fileadmin/user_upload/news/IUPAC_Periodic_Table-1Jun12.pdf.

Specific examples of aluminum alkyls having general formula (IV) particularly useful for the purpose of the present invention are: tri-methyl-aluminum, tri-(2,3,3-tri-methyl-butyl)-aluminum, tri-(2,3-di-methyl-hexyl)-aluminum, tri-(2,3-di-methyl-butyl)-aluminum, tri-(2,3-di-methyl-pentyl)-aluminum, tri-(2,3-di-methyl-heptyl)-aluminum, tri-(2-methyl-3-ethyl-pentyl)-aluminum, tri-(2-methyl-3-ethyl-hexyl)-aluminum, tri-(2-methyl-3-ethyl-heptyl)-aluminum, tri-(2-methyl-3-propyl-hexyl)-aluminum, tri-ethyl-aluminum, tri-(2-ethyl-3-methyl-butyl)-aluminum, tri-(2-ethyl-3-methyl-pentyl)-aluminum, tri-(2,3-di-ethyl-pentyl-aluminum), tri-n-propyl-aluminum, tri-iso-propyl-aluminum, tri-(2-propyl-3-methyl-butyl)-aluminum, tri-(2-iso-propyl-3-methyl-butyl)-aluminum, tri-n-butyl-aluminum, tri-iso-butyl-aluminum (TIBA), tri-tert-butyl-aluminum, tri-(2-iso-butyl-3-methyl-pentyl)-aluminum, tri-(2,3,3-tri-methyl-pentyl)-aluminum, tri-(2,3,3-tri-methyl-hexyl)-aluminum, tri-(2-ethyl-3,3-di-methyl-butyl)-aluminum, tri-(2-ethyl-3,3-di-methyl-pentyl)-aluminum, tri-(2-iso-propyl-3,3-dimethyl-butyl)-aluminum, tri-(2-tri-methylsilyl-propyl)-aluminum, tri-(2-methyl-3-phenyl-butyl)-aluminum, tri-(2-ethyl-3-phenyl-butyl)-aluminum, tri-(2,3-di-methyl-3-phenyl-butyl)-aluminum, tri-(2-phenyl-propyl)-aluminum, tri-[2-(4-fluoro-phenyl)-propyl]-aluminum, tri-[2-(4-chloro-phenyl)-propyl]-aluminum, tri-[2-(3-iso-propyl-phenyl-tri-(2-phenyl-butyl)-aluminum, tri-(3-methyl-2-phenyl-butyl)-aluminum, tri-(2-phenyl-pentyl)-aluminum, tri-[2-(penta-fluoro-phenyl)-propyl]-aluminum, tri-(2,2-diphenyl-ethyl]-aluminum, tri-(2-phenyl-methyl-propyl]-aluminum, tri-pentyl-aluminum, tri-hexyl-aluminum, tri-cyclohexyl-aluminum, tri-octyl-aluminum, di-ethyl-aluminum hydride, di-n-propyl-aluminum hydride, di-n-butyl-aluminum hydride, di-iso-butyl-aluminum hydride (DIBAH), di-hexyl-aluminum hydride, di-iso-hexyl-aluminum hydride, di-octyl-aluminum hydride, di-iso-octyl-aluminum hydride, ethyl-aluminum di-hydride, n-propyl-aluminum di-hydride, iso-butyl-aluminum di-hydride, di-ethyl-aluminum chloride (DEAC), mono-ethyl-aluminum dichloride (EADC), di-methyl-aluminum chloride, di-iso-butyl-aluminum chloride, iso-butyl-aluminum dichloride, ethyl-aluminum-sesquichloride (EASC), as well as the corresponding compounds wherein one of the hydrocarbon substituents is substituted by a hydrogen atom and those wherein one or two of the hydrocarbon substituents are substituted with an iso-butyl group. Tri-ethyl-aluminum, tri-iso-butyl-aluminum (TIBA), di-iso-butyl-aluminum hydride (DIBAH), are particularly preferred.

Preferably, when used for the formation of a catalytic (co)polymerization system in accordance with the present invention, the aluminum alkyls having general formula (IV) can be placed in contact with a nitrogen titanium complex having general formula (I) or (II), in proportions such that the molar ratio between the titanium contained in the nitrogen titanium complex having general formula (I) or (II) and the aluminum contained in the aluminum alkyls having general formula (IV) can be ranging from 5 to 5000, preferably ranging from 10 to 1000. The sequence with which the nitrogen titanium complex having general formula (I) or (II) and the aluminum alkyl having general formula (IV) are placed in contact with each other is not particularly critical.

Further details on aluminum alkyls having general formula (IV) can be found in international patent application WO 2011/061151.

In accordance with a particularly preferred embodiment, said organo-oxygenated compounds ($b_2$) can be selected from the aluminoxanes having general formula (V):

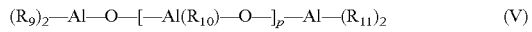

wherein $R_9$, $R_{10}$ e $R_{11}$, identical or different, represent a hydrogen atom, or a halogen atom such as, for example, chlorine, bromine, iodine, fluorine; or are selected from $C_1$-$C_{20}$ alkyl groups, linear or branched, cycloalkyl groups, aryl groups, said groups being optionally substituted with one or more atoms of silicon or germanium; and p' is an integer ranging from 0 to 1000.

As it is known, aluminoxanes are compounds containing Al—O—Al bonds, with a variable O/Al ratio, obtainable according to processes known in the prior art such as, for example, by reaction, in controlled conditions, of an aluminum alkyl, or of an aluminum alkyl halide, with water, or with other compounds containing predetermined quantities of available water such as, for example, in the case of the reaction of aluminum trimethyl with aluminum sulfate hexahydrate, copper sulfate pentahydrate, or iron sulfate pentahydrate. Said aluminoxanes and, in particular, methylaluminoxane (MAO), are compounds that can be obtained through known organometallic chemical procedures such as, for example, by adding trimethyl aluminum to a suspension in hexane of aluminum sulfate hydrate.

Preferably, when used for the formation of a catalytic (co)polymerization system in accordance with the present invention, the aluminoxanes having general formula (V) can be placed in contact with a nitrogen titanium complex having general formula (I) or (II), in proportions such that the molar ratio between the aluminum (Al) contained in the aluminoxane having general formula (V) and the titanium contained in the nitrogen titanium complex having general formula (I) or (II) is ranging from 10 to 10000, preferably ranging from 100 to 5000. The sequence with which the nitrogen titanium complex having general formula (I) or (II) and the aluminoxane having general formula (V) are placed in contact with each other is not particularly critical.

As well as the aforementioned preferred aluminoxanes having general formula (V), the definition of the compound ($b_2$) in accordance with the present invention also includes galloxanes wherein, in the general formula (V), gallium is contained in the place of aluminum and stannoxanes wherein, in the general formula (V), tin is contained in the place of aluminum, whose use as co-catalysts for the polymerization of olefins in the presence of metallocene complexes is known. Further details in relation to said galloxanes and stannoxanes can be found, for example, in the U.S. Pat. Nos. 5,128,295 and 5,258,475.

Specific examples of aluminoxanes having general formula (V) particularly useful for the purpose of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TTMBAO). Methylaluminoxane (MAO), as such or in the "dry" form (MAO-dry), is particularly preferred.

Further details on aluminoxanes having general formula (V) can be found in international patent application WO 2011/061151.

In accordance with a preferred embodiment of the present invention, said compounds or mixtures of compounds ($b_3$) can be selected from organic compounds of aluminum and especially of boron, such as, for example, those represented by the following general formulae:

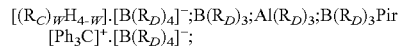

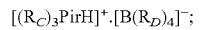

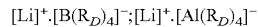

wherein w is an integer ranging from 0 to 3, each $R_C$ group independently represents an alkyl group or an aryl group having from 1 to 10 carbon atoms and each $R_D$ group independently represents an aryl group partially or totally, preferably totally fluorinated, having from 6 to 20 carbon atoms, Pir represents a pyrrole radical optionally substituted. Preferably, when used for the formation of a catalytic (co)polymerization system in accordance with the present invention, the compounds or mixtures of compounds ($b_3$) can be placed in contact with a nitrogen titanium complex having general formula (I) or (II), in proportions such that the molar ratio between the metal (M') contained in the compounds or mixtures of compounds ($b_3$) and the titanium (Ti) contained in the nitrogen titanium complex having general formula (I) or (II) is ranging from 0.1 to 15, preferably ranging from 0.5 to 10, more preferably ranging from 1 to 6. The sequence with which the nitrogen titanium complex having general formula (I) or (II) and the compound or mixture of compounds ($b_3$) are placed in contact with each other is not particularly critical.

Said compounds or mixtures of compounds ($b_3$), especially in the case wherein $X_1$, $X_2$, $X_3$ and $X_4$ in the nitrogen titanium compound having general formula (I) or $X'_1$ and $X'_2$ in the nitrogen titanium complex having general formula (II), are different from alkyl, must be used in combination with an aluminoxane having general formula (V) such as, for example, methylaluminoxane (MAO), or, preferably, with an aluminum alkyl having general formula (IV), more preferably a trialkylaluminum having from 1 to 8 carbon atoms in each alkyl residue, such as, for example, tri-methyl-aluminum, tri-ethyl-aluminum, tri-iso-butylaluminum (TIBA).

Examples of the methodologies generally used for the formation of a catalytic (co)polymerisation system in accordance with the present invention, in the case of using compounds or mixtures of compounds ($b_3$), are qualitatively schematized in the list reported below, which does not however limit the overall scope of the present invention:

($m_1$) contact of a nitrogen titanium complex having general formula (I) or (II) wherein at least one of $X_1$, $X_2$, $X_3$ and $X_4$ in the nitrogen titanium complex having general formula (I) or at least one of $X'_1$ and $X'_2$ in the nitrogen titanium complex having general formula (II), is an alkyl group, with at least one compound or mixture of compounds ($b_3$) whose cation is able to react with said alkyl group to form a neutral compound, and whose anion is voluminous, non-coordinating and able to delocalize the negative charge;

($m_2$) reaction of a nitrogen titanium complex having general formula (I) or (II) with at least one aluminum alkyl having general formula (IV), preferably a trialkylaluminum, used in excess molar ratio from 10/1 to 300/1, followed by the reaction with a strong Lewis acid, such as, for example, tris(pentafluorophenyl)boron [compound ($b_3$)], in almost stoichiometric quantities or in slight excess with respect to the titanium (Ti);

($m_3$) contact and reaction of a nitrogen titanium compound having general formula (I) or (II) with an excess molar ratio from 10/1 to 1000/1, preferably from 100/1 to 500/1 of at least one trialkylaluminum or one aluminum alkyl halide that can be represented with the formula $AlR'''_m Z_{3-m}$ wherein $R'''$ is a $C_1$-$C_8$ alkyl group, linear or branched, or a mixture thereof, Z is a halogen, preferably chlorine or bromine, and m is a decimal number ranging from 1 to 3, followed by the addition to the composition thus obtained of at least one compound or mixture of compounds ($b_3$) in quantities such that the ratio between said compound or mixture of compounds ($b_3$) or the aluminum of said compound or mixture of compounds ($b_3$) and the titanium (Ti) of the nitrogen titanium complex having general formula (I) or (II) is ranging from 0.1 to 15, preferably ranging from 1 to 6.

Examples of compounds or mixtures of compounds ($b_3$) able to produce a ionic catalytic system by reaction with a nitrogen titanium complex having general formula (I) or (II) according to the present invention are described, although with reference to the formation of ionic metallocene complexes, in the following publications, whose contents is incorporated herein for reference purposes:

W. Beck et al., "*Chemical Reviews*" (1988), Vol. 88, pg. 1405-1421;

S. H. Stares, "*Chemical Reviews*" (1993), Vol. 93, pg. 927-942;

European patent applications EP 277 003, EP 495 375, EP 520 732, EP 427 697, EP 421 659, EP 418044;

international patent applications WO 92/00333, WO 92/05208.

Specific examples of compounds or mixtures of compounds ($b_3$) particularly useful for the purpose of the present invention are: tributylammonium-tetrakis-pentafluorophenyl-borate, tributylammonium-tetrakis-pentafluorophenyl-aluminate, tributylammonium-tetrakis-[(3,5-di-(trifluorophenyl)]-borate, tributylammonium-tetrakis-(4-fluorophenyl)]-borate, N,N-dimethylbenzylammonium-tetrakis-pentafluoro-phenyl-borate, N,N-dimethyl-hexylammonium-tetrakis-pentafluorophenyl-borate, N,N-dimethylanilinium-tetrakis-(pentafluorophenyl)-borate, N,N-dimethylanilinium-tetrakis-(pentafluorophenyl)-aluminate, di-(propyl)-ammonium-tetrakis-(pentafluorophenyl)-borate, di-(cyclohexyl)-ammonium-tetrakis-(pentafluorophenyl)-borate, tri-phenyl-carbenium-tetrakis-(pentafluorophenyl)-borate, tri-phenylcarbenium-tetrakis-(penta-fluorophenyl)-aluminate, tris(pentafluorophenyl) borane, tris(pentafluorophenyl)-aluminum, or mixtures thereof. Tetrakis-pentafluorophenyl-borates are preferred.

For the purpose of the present description and of the following claims, the terms "mole" and "molar ratio" are used both with reference to compounds consisting of molecules and with reference to atoms and ions, omitting for the latter ones the terms gram atom or atomic ratio, even if they are scientifically more accurate.

For the purpose of the present invention, other additives or components may optionally be added to the aforementioned catalytic system so as to adapt it to satisfy specific practical requirements. The catalytic systems thus obtained can therefore be considered included within the scope of the present invention. Additives and/or components that can be added in the preparation and/or formulation of the catalytic system according to the present invention are, for example: inert solvents, such as, for example, aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared, as already reported above, according to methods known in the prior art.

For example, said catalytic system can be prepared separately (preformed) and subsequently introduced into the (co)polymerization environment. On that point, said catalytic system can be prepared by making at least one nitrogen titanium complex having general formula (I) or (II) (a) react with at least one co-catalyst (b), optionally in the presence of other additives or components selected from those reported above, in the presence of a solvent such as, for example, toluene, heptane, at a temperature ranging from 20° C. to 60° C., for a time ranging from 10 seconds to 10 hours, preferably ranging from 30 seconds to 5 hours. Further details on the preparation of said catalytic system can be found in the examples reported below.

Alternatively, said catalytic system can be prepared in situ, i.e. directly in the (co)polymerization environment. On that point, said catalytic system can be prepared by separately introducing the nitrogen titanium complex having general formula (I) or (II) (a), the co-catalyst (b) and the pre-selected conjugated diene(s) to be (co)polymerized, operating at the conditions wherein the (co)polymerization is carried out.

For the purpose of the present invention, the aforementioned catalytic systems can also be supported on inert solids, preferably comprising silicon and/or aluminium oxides, such as, for example, silica, alumina or silico-aluminates. For supporting said catalytic systems the known supporting techniques can be used, generally comprising the contact, in a suitable inert liquid medium, between the support, optionally activated by heating to temperatures over 200° C., and one or both components (a) and (b) of the catalytic system according to the present invention. It is not necessary, for the purposes of the present invention, for both components to be supported, since only the nitrogen titanium complex having general formula (I) or (II) (a), or the co-catalyst (b) may be present on the support surface. In the latter case, the missing component on the surface is subsequently placed in contact with the supported component when the active catalyst is to be formed by polymerization.

The scope of the present invention also includes the nitrogen titanium complex having general formula (I) or (II), and catalytic systems based thereon, which are supported on a solid through the functionalization of the latter and the formation of a covalent bond between the solid and the nitrogen titanium complex having general formula (I) or (II). Furthermore, the present invention relates to a (co)polymerization process of conjugated dienes, characterized in that it uses said catalytic system.

The quantity of nitrogen titanium complex having general formula (I) or (II) (a) and of co-catalyst (b) which can be used in the (co)polymerization of conjugated dienes varies according to the (co)polymerization process to be carried out. Said quantity is however such as to obtain a molar ratio between the titanium (Ti) contained in the nitrogen titanium complex having general formula (I) or (II) and the metal contained in the co-catalyst (b), e.g., aluminum in the case wherein the co-catalyst (b) is selected from the aluminum alkyls ($b_1$) or from the aluminoxanes ($b_2$), boron in the case wherein the co-catalyst (b) is selected from the compounds or mixtures of compounds ($b_3$) having general formula (III), ranging from the values reported above.

Specific examples of conjugated dienes that can be (co)polymerized using the catalytic system in accordance with the present invention are: 1,3-butadiene, isoprene (2-methyl-1,3-butadiene), 2,3-dimethyl-1,3-butadiene, 1,3-pentadiene, 1,3-hexadiene, cyclo-1,3-hexadiene. 1,3-Butadiene, isoprene (2-methyl-1,3-butadiene), are preferred. The aforementioned (co)polymerizable conjugated dienes can be used alone, or mixed with two or more dienes. In this latter case, i.e. using a mixture of two or more dienes, a copolymer will be obtained.

In accordance with a particularly preferred embodiment, the present invention relates to a (co)polymerization process of 1,3-butadiene or isoprene (2-methyl-1,3-butadiene), characterized in that it uses said catalytic system.

Generally, said (co)polymerization can be carried out in the presence of a polymerization solvent, generally selected from inert organic solvents, such as, for example: saturated aliphatic hydrocarbons such as, for example, butane, pentane, hexane, heptane, or mixtures thereof; saturated cycloaliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. Preferably, the (co)polymerization solvent is selected from saturated alyphatic hydrocarbons.

Alternatively, said (co)polymerization may be carried out using as a (co)polymerization solvent the same conjugated diene(s) that must be (co)polymerized, in accordance with the process known as "bulk process".

Generally, the concentration of the conjugated diene to be (co)polymerized in said (co)polymerization solvent is ranging from 5% by weight to 50% by weight, preferably ranging from 10% by weight to 20% by weight, with respect to the total weight of the mixture conjugated diene and inert organic solvent.

Generally, said (co)polymerization can be carried out at a temperature ranging from −70° C. to +100° C., preferably ranging from −20° C. to +80° C.

With regard to pressure, it is preferable to operate at the pressure of the components of the mixture to be (co)polymerized.

Said (co)polymerization can be carried out both continuously and in batch.

As mentioned above, said procedure allows (co)polymers of conjugated dienes to be obtained, such as, for example, polybutadiene with a prevalent 1,4-cis unit content (i.e. 1,4-cis unit content >80%), or polyisoprene with a variable 1,4-cis/3,4 unit content (i.e. 1,4-cis unit content ranging from 30% to 60% and a 3,4 unit content ranging from 40% to 70%).

For the purpose of understanding the present invention better and to put it into practice, below are some illustrative and non-limitative examples thereof.

EXAMPLES

Reagents and Materials

The list below reports the reagents and materials used in the following examples of the invention, their potential pre-treatments and their manufacturer:

2,6-di-iso-propylaniline (Aldrich): used as such;
2-pyridinecarboxaldehyde (Aldrich): used as such;
2-acetylpyridine (Aldrich): used as such;
2-tert-butylaniline (Aldrich): used as such;
titanium tetrachloride anhydrous (Aldrich): degree of purity 99.9%, distilled prior to use;
titanium trichloride: tetrahydrofuran complex (1:3) [TiCl$_3$(THF)$_3$] (Aldrich); used as such;
n-butyl lithium (Aldrich): used as such;
2,4-pentanedione (Aldrich): used as such;
aniline (Aldrich): distilled at reduced pressure and stored in an inert atmosphere;
2,4,6-tri-methylaniline (Aldrich): used as such;
p-toluidine (Aldrich): used as such;
dichloromethane (Carlo Erba, RPE): used as such;
formic acid (Aldrich): used as such;
ethyl ether (Aldrich): used as such;
sodium sulfate (Aldrich): used as such;
tetrahydrofuran (THF) (Aldrich): used as such;
toluene (Fluka): degree of purity >99.5%, refluxed over sodium (Na) for about 8 hours, then distilled and stored over molecular sieves under nitrogen;
hexane (Aldrich): used as such;
heptane (Aldrich): pure, ≥99%, distilled over sodium (Na) in an inert atmosphere; benzene (Aldrich): used as such;
sodium borohydride (Aldrich): used as such;
ethyl acetate (Aldrich): used as such;
1,3-butadiene (Air Liquide): pure, ≥99.5%, evaporated from the container before each production, dried by passing it through a molecular sieve packed column and condensed inside the reactor that was pre-cooled to −20° C.;
isoprene (Aldrich): pure, ≥99%, refluxed over calcium hydride for 2 hours, then distilled "trap-to-trap" and maintained in a nitrogen atmosphere at 4° C.;
methylaluminoxane (MAO) (toluene solution 10% by weight) (Aldrich): used as such;
methanol (Carlo Erba, RPE): used as such, or optionally anhydrified by distillation on magnesium (Mg);
hydrochloric acid in 37% aqueous solution (Aldrich): used as such;
1,2-dichlorobenzene (Aldrich): degree of purity 99%, refluxed over calcium hydride (CaH$_2$) for about 8 hours, then distilled and stored over molecular sieves under nitrogen;
dichloromethane-d$_2$ (CD$_2$Cl$_2$) (Aldrich): used as it is;
deuterated tetrachloroethylene (C$_2$D$_2$Cl$_4$) (Acros): used as such;
deuterated chloroform (CDCl$_3$) (Acros): used as such; hexamethyldisiloxane (HDMS) (Aldrich—"NMR grade"): degree of purity ≥99.5%, used as such;
tetramethylsilane (TMS) (Aldrich—"ACS reagent, NMR grade"): degree of purity ≥99.9%, used as such.

The analysis and classification methodologies reported below were used.

Elemental Analysis a) Determination of Titanium (Ti)

For the determination of the quantity by weight of titanium (Ti) in the nitrogen titanium complexes object of the present invention, an exactly weighed aliquot, operating in dry-box under nitrogen flow, of about 30 mg-50 mg of sample, was placed in a about 30 ml platinum crucible, together with a 1 ml mixture of 40% hydrofluoric acid (HF) (Aldrich), 0.25 ml of 96% sulphuric acid (H$_2$SO$_4$) (Aldrich) and 1 ml of 70% nitric acid (HNO$_3$) (Aldrich). The crucible was then heated on a hot plate increasing the temperature until white sulfur fumes appeared (about 200° C.). The mixture thus obtained was cooled to room temperature (20° C.-25° C.) and 1 ml of 70% nitric acid (HNO$_3$) (Aldrich)

was added, then it was brought again to the appearance of fumes. After repeating the sequence another two times, a clear, almost colorless, solution was obtained. 1 ml of 70% nitric acid (HNO$_3$) (Aldrich) and about 15 ml of water were then added, in cold, then heated to 80° C. for about 30 minutes. The sample thus prepared was diluted with MilliQ pure water until it weighed about 50 g, precisely weighed, to obtain a solution on which the instrumental analytical determination was carried out using a Thermo Optek IRIS Advantage Duo ICP-OES (plasma optical emission) spectrometer, for comparison with solutions of known concentration. For this purpose, for every analyte, a calibration curve was prepared in the range 0 ppm-10 ppm, measuring calibration solutions by dilution by weight of certified solutions.

The solution of sample prepared as above was then diluted again by weight in order to obtain concentrations close to the reference ones, before carrying out spectrophotometric measurement. All the samples were prepared in double quantities. The results was considered acceptable if the individual repeated test data did not have a relative deviation of more than 2% with respect to their mean value.

Elemental Analysis b) Determination of Chlorine

For said purpose, samples of nitrogen titanium complexes object of the present invention, about 30 mg-50 mg, were precisely weighed in 100 ml glass beakers in dry-box under nitrogen flow. 2 g of sodium carbonate (Na$_2$CO$_3$) (Aldrich) were added and, outside the dry-box, 50 ml of MilliQ water. It was brought to the boil on the hot plate, under magnetic stirring, for about 30 minutes. It was left to cool, then 1/5 diluted sulfuric acid (H$_2$SO$_4$) (Aldrich) was added, until acid reaction and was then titrated with 0.1 N silver nitrate (AgNO$_3$) (Aldrich) with a potentiometric titrator.

c) Determination of Carbon, Hydrogen and Nitrogen

The determination of carbon, hydrogen and nitrogen, in the nitrogen titanium complexes object of the present invention, as well as in the ligands used for the purpose of the present invention, was carried out through a Carlo Erba automatic analyzer Mod. 1106.

$^{13}$C-HMR and $^{1}$H-HMR Spectra

The $^{13}$C-HMR and $^{1}$H-HMR spectra were recorded using a nuclear magnetic resonance spectrometer mod. Bruker Avance 400, using deuterated tetrachloroethylene (C$_2$D$_2$Cl$_4$) at 103° C., and hexamethyldisiloxane (HDMS) as internal standard, or using deuterated chloroform (CDCl$_3$) or dichloromethane-d$_2$ (CD$_2$Cl$_2$), at 25° C., and tetramethylsilane (TMS) as internal standard. For this purpose, polymeric solutions were used with concentrations equal to 10% by weight with respect to the total weight of the polymeric solution.

The microstructure of the polymers [i.e. 1,4-cis unit content (%) in polybutadiene; 1,4-cis unit content (%) and 3,4 unit content in polyisoprene] was determined through the analysis of the aforementioned spectra on the basis of what reported in literature by Mochel, V. D., in "*Journal of Polymer Science Part A*-1: *Polymer Chemistry*" (1972), Vol. 10, Issue 4, pg. 1009-1018.

FT-IR Spectra (Solid State—ATR)

The FTIR-ATR spectra were recorded using a Bruker IFS 48 spectrophotometer equipped with a Thermo Spectra-Tech horizontal ATR connection. The section wherein the samples to be analyzed are placed is a Fresnel ATR accessory (Shelton, Conn., USA) which uses crystals of zirconium selenide (ZrSe) with an angle of incidence of 45° in the horizontal direction.

The FT-IR spectra (solid state—ATR) of the nitrogen titanium complexes used in the present invention, were obtained by inserting samples of the nitrogen titanium complex to be analyzed into said section.

FT-IR Spectra

The FT-IR spectra were recorded through Thermo Nicolet Nexus 670 and Bruker IFS 48 spectrophotometers.

The FT-IR spectra of the polymers were obtained from polymeric films on potassium bromide (KBr) tablets, said films being obtained through the deposition of a solution in hot 1,2-dichlorobenzene to be analyzed. The concentration of the polymeric solutions analyzed was equal to 10% by weight with respect to the total weight of the polymeric solution.

Determination of the Molecular Weight

The determination of the molecular weight (MW) of the polymers obtained was carried out through GPC (Gel Permeation Chromatography) operating under the following conditions:

Agilent 1100 pump;
Agilent 1100 I.R. detector;
PL Mixed-A columns;
solvent/eluent: tetrahydrofuran (THF);
flow rate: 1 ml/min;
temperature: 25° C.;
molecular mass calculation: Universal Calibration method.

The weight-average molecular weight ($M_w$) and the Polydispersion Index (PDI) are reported, corresponding to the ratio $M_w/M_n$ ($M_n$=number-average molecular weight).

Gas Chromatography-Mass Spectrometry (GC-MS)

Gas chromatography-mass spectrometry (GC-MS) was carried out using a Thermo ISQ single quadrupole mass spectrometer. For that purpose, samples of the ligands used for the purpose of the present invention to be analyzed were dissolved in methylene chloride (CH$_2$Cl$_2$) at a concentration of 0.1 mg/ml and were analyzed using said spectrometer operating under the following conditions:

ionization method: electronic ionization (EI);
GC ramp: 50° C. for 2 minutes, heating at a speed of 10° C./min to 300° C.;
injector temperature: 300° C.;
injection volume: 1.30 µl;
transfer line temperature: 280° C.;
ionic source temperature: 250° C.;
quadrupole scan parameters: 35 amu-500 amu with scan time of 0.2 sec.

Example 1

Synthesis of Ligand Having Formula (L1)

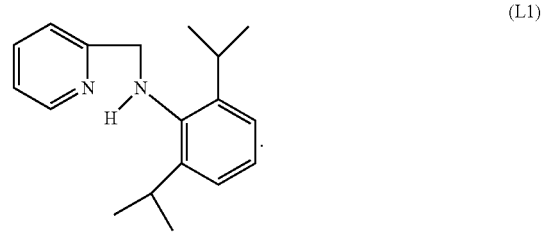

(L1)

1.1 Synthesis of Compound Having Formula (L1a)

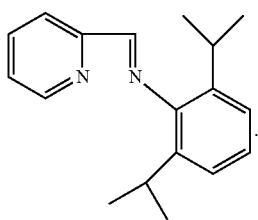

(L1a)

In a 500 ml flask equipped with a Dean-Stark trap for the azeotropic removal of water, 2-pyridinecarboxaldehyde (16.86 g, 157.5 mmoles) was added to a solution of 2,6-di-iso-propylaniline (27.93 g, 157.5 mmoles) in dichloromethane (300 ml). The mixture obtained was heated under reflux for 20 hours and then dried under vacuum obtaining 41.7 g of a yellow solid (yield=99%) corresponding to the compound having formula (L1a).

Elemental analysis [found (calculated for $C_{18}H_{22}N_2$)]: C: 81.14% (81.16%); H: 8.33% (8.32%); N: 10.6% (10.52%).

$^1$H-NMR ($CD_2Cl_2$, δ ppm): 8.72 (d, 1H, PyH), 8.32 (s, 1H CH=N), 8.27 (d, 1H PyH), 7.86 (t, 1H PyH), 7.39 (m, 1H PyH), 7.11-7.20 (m, 3H ArH), 3.00 (sept, 2H CHMe$_2$), 1.18 (d, 12H C(CH$_3$)$_2$).

1.2 Synthesis of Ligand Having Formula (L1)

28 g (105.1 mmoles) of the compound having formula (L1a) obtained as described above and 1800 ml of anhydrous methanol were loaded into a 2 liter reactor, equipped with a stirrer: the whole was cooled to 0° C. and, subsequently, sodium borohydride (70 g, 1850 mmoles) was added, in small portions. The mixture obtained was left, under stirring, at room temperature, all night, and then switched off with brine and extracted with ethyl acetate. The solvent was then removed by distillation at reduced pressure and the residue obtained was purified through elution on a silica gel chromatography column [eluent: mixture of hexane/ethyl acetate in ratio of 9/1 (v/v)], and subsequently treated with cold ethyl ether, obtaining 16.9 g of a crystalline white solid (yield=60%) corresponding to the ligand having formula (L1).

Elemental analysis [found (calculated for $C_{18}H_{24}N_2$)]: C: 80.49% (80.55%); H: 8.99% (9.01%); N: 10.37% (10.44%).

FT-IR (solid state—ATR): 3309, 1588, 1570, 1493, 1463, 1435.

$^1$H-NMR (CDCl$_3$, δ ppm): 8.61 (d, 1H,o-PyH), 7.66 (td, 1H, PyH), 7.30 (d, 1H, PyH), 7.21 (m, 1H, PyH), 7.04-7.12 (m, 3H, ArH), 4.20 (s, 2H, CH$_2$), 4.10 (s, 1H, NH), 3.47 (m, 2H, —CH(CH$_3$)$_2$), 1.42 (d, 12H, —CH(CH$_3$)$_2$).

GC-MS: M$^+$=m/z 268; [M-C$_3$H$_7$]$^+$=m/z 225; [M-C$_6$H$_6$N]$^+$=m/z 176; m/z 93 C$_6$H$_7$N.

Example 2

Synthesis of Ligand Having Formula (L2)

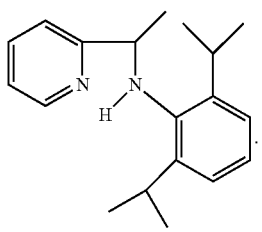

(L2)

2.1 Synthesis of Compound Having Formula (L2a)

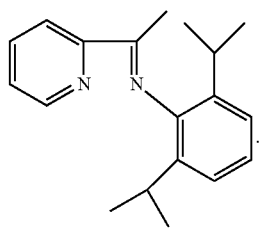

(L2a)

In a 500 ml flask, 2-acetylpyridine (9.1 g, 75 mmoles) was added to a solution of 2,6-di-iso-propylaniline (13.3 g, 75 mmoles) in methanol (300 ml): the mixture obtained was left, under stirring, at room temperature, for 48 hours. The precipitate obtained was filtered and subsequently dried under vacuum obtaining 14 g of a yellow crystalline powder (yield=67%) corresponding to the compound having formula (L2a).

Elemental analysis [found (calculated for $C_{19}H_{24}N_2$)]: C: 81.37% (81.38%); H: 8.64% (8.63%); N: 10.01% (9.99%).

$^1$H-NMR (CDCl$_3$, δ ppm) 8.69 (d, 1H, PyH), 8.38 (d, 1H, PyH), 7.82 (t, 1H, PyH), 7.39 (m, 1H, PyH), 7.11-7.20 (m, 3H, ArH), 2.75 (m, 2H, CHMe$_2$), 2.21 (s, 3H, N=CH-Me), 1.15 (d, 12H, CH(CH$_3$)$_2$).

2.2 Synthesis of Ligand Having Formula (L2)

24 g (85 mmoles) of the compound having formula (L2a) obtained as described above and 900 ml of anhydrous methanol were loaded into a 2 liter reactor, equipped with a stirrer: the whole was cooled to 0° C. and, subsequently, sodium borohydride (48.6 g, 1285 mmoles) was added, in small portions. The mixture obtained was left, under stirring, at room temperature, all night, and then switched off with brine and extracted with ethyl acetate. The solvent was then removed by distillation at reduced pressure and the residue obtained was purified through elution on a silica gel chromatography column [eluent: mixture of hexane/ethyl acetate in ratio of 9/1 (v/v)], and subsequently treated with cold ethyl ether, obtaining 11 g of a crystalline white solid (yield=46%) corresponding to the ligand having formula (L2).

Elemental analysis [found (calculated for $C_{19}H_{26}N_2$)]: C: 81.03% (80.80%); H: 9.42% (9.28%); N: 10.01% (9.92%).

GC-MS: M$^+$=m/z 282; [M-C$_3$H$_7$]$^+$=m/z 239; [M-C$_7$H$_8$N]$^+$=m/z 176; [M-C$_{12}$H$_{18}$N]$^+$=m/z 106.

$^1$H-NMR (CDCl$_3$, δ ppm): 8.64 (d, 1H, HPy), 7.53 (dt, 1H, HPy), 7.2 (d, 1H, HPy), 7.00-7.12 (m, 1H, HPy; m, 3H, ArH), 4.0-4.2 (m, 1H, NCH(CH$_3$), m, 1H, NH), 3.30 (sept, 2H, —CH(CH$_3$)$_2$), 1.55 (d, 3H, —NCH(CH$_3$)), 1.10 (s, 12H, —CH(CH$_3$)$_2$).

Example 3

Synthesis of Ligand Having Formula (L3)

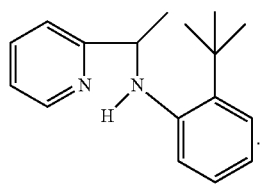
(L3)

3.1 Synthesis of Compound Having Formula (L3a)

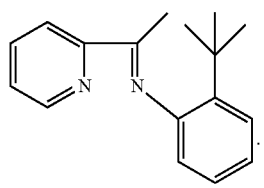
(L3a)

In a 500 ml flask, 2-acetylpyridine (12.9 g, 106.5 mmoles) was added to a solution of 2-tert-butylaniline (15.89 g, 106.5 mmoles) in methanol (300 ml): the mixture obtained was left, under stirring, at room temperature, for 48 hours. The solvent was subsequently removed by evaporation and the residue obtained was crystallized by methanol obtaining 20 g of a yellow crystalline powder (yield=75%) corresponding to the compound having formula (L3a).

Elemental analysis [found (calculated for $C_{17}H_{20}N_2$)]: C: 81.17% (80.91%); H: 8.14% (7.99%); N: 10.91% (11.10%).

3.2 Synthesis of Ligand Having Formula (L3)

28 g (111 mmoles) of the compound having formula (L3a) obtained as described above and 800 ml of anhydrous methanol were loaded into a 2 liter reactor, equipped with a stirrer: the whole was cooled to 0° C. and, subsequently, sodium borohydride (38 g, 1004 mmoles) was added, in small portions. The mixture obtained was left, under stirring, at room temperature, all night, and then switched off with brine and extracted with ethyl acetate. The solvent was then removed by distillation at reduced pressure and the residue obtained was purified through elution on a silica gel chromatography column [eluent: mixture of hexane/ethyl acetate in ratio of 9/1 (v/v)], and subsequently treated with cold ethyl ether, obtaining 11 g of a crystalline white solid (yield=39%) corresponding to the ligand having formula (L3).

Elemental analysis [found (calculated for $C_{17}H_{22}N_2$)]: C: 80.00% (80.27%); H: 9.12% (8.72%); N: 11.31% (11.01%).

GC-MS: $M^+$=m/z 254; $[M-CH_3]^+$=m/z 239; $[M-C_4H_9]$=m/z 197; m/z=183; m/z 132 $C_7H_{10}N_2$; $[M-C_{10}H_{14}N]^+$=m/z 106; $[M-C_{12}H_{18}N]^+$=m/z 78.

$^1$H-NMR (CDCl$_3$, δ ppm): 8.64 (d, 1H, HPy), 7.7 (td, 1H, PyH), 7.36 (d, 1H, HPy), 7.25 (d, 1H, ArH), 7.18 (td, 1H, PyH), 6.98 (td, 1H, PyH), 6.98 (td, 1H, PyH), 6.48 (d, 1H, PyH), 5.0 (broad s, 1H, NH), 4.7 (q, 1H, NCH(CH$_3$)), 1.57 (d, 3H, —NCH(CH$_3$)), 1.5 (s, 9H, —C(CH$_3$)$_3$).

Example 4

Synthesis of Ligand Having Formula (L4)

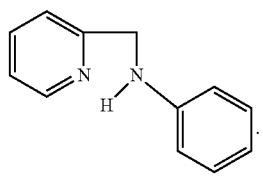
(L4)

4.1 Synthesis of Compound Having Formula (L4a)

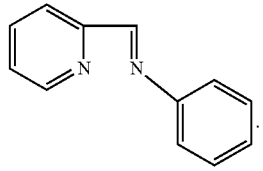
(L4a)

In a 500 ml flask, 2-pyridinecarboxaldehyde (30 g, 280 mmoles) and some drops of formic acid were added to a solution of aniline (26.1 g, 280 mmoles) in methanol (250 ml): the mixture obtained was left, under stirring, at room temperature, for 48 hours. Subsequently, the mixture obtained was dried under vacuum and the residue obtained was purified through elution on a silica gel chromatography column [eluent: mixture of heptane/ethyl acetate in ratio of 99/1 (v/v)], obtaining 38 g of a light yellow solid (yield=74.5%) corresponding to the compound having formula (L4a).

Elemental analysis [found (calculated for $C_{12}H_{10}N_2$)]: C: 80.00% (79.10%); H: 5.83% (5.53%); N: 15.71% (15.37%).

$^1$H-NMR (CDCl$_3$, δ ppm) 8.70 (d, 1H, HPy), 8.59 (s, 1H CH=N), 8.19 (d, 1H, HPy), 7.77 (dt, 1H, HPy), 7.23-7.42 (m, 1H, HPy; m, 5H, Ar).

4.2 Synthesis of Ligand Having Formula (L4)

13 g (71.3 mmoles) of the compound having formula (L4a) obtained as described above and 700 ml of anhydrous methanol were loaded into a 2 liter reactor, equipped with a stirrer: the whole was cooled to 0° C. and, subsequently, sodium borohydride (40 g, 1057 mmoles) was added, in small portions. The mixture obtained was left, under stirring, at room temperature, all night, and then switched off with brine and extracted with ethyl acetate. The solvent was then removed by distillation at reduced pressure and the residue obtained was purified through elution on a silica gel chromatography column [eluent: mixture of hexane/ethyl acetate in ratio of 9/1 (v/v)], and subsequently treated with cold ethyl ether, obtaining 9.12 g of a crystalline white solid (yield=69.5%) corresponding to the ligand having formula (L4).

GC-MS: $M^+$=m/z 184; $[M-C_6H_6N]^+$=m/z 106; $[M-C_7H_7N_2]^+$=m/z 77.

$^1$H-NMR (CDCl$_3$, δ ppm): 8.60 (dd, 1H, PyH), 7.64 (m, 1H, PyH), 7.35 (d, 1H, PyH), 7.22-7.17 (m, 1H, Py, 2H, ArH), 6.75 (dt, 1H, ArH), 6.69 (d, 2H, ArH), 4.8 (s, 1H, NH), 4.48 (s, 2H, Py-CH$_2$N).

Example 5

Synthesis of Ligand Having Formula (L5)

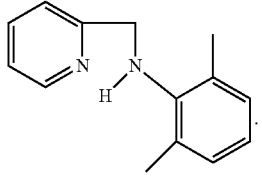

(L5)

5.1 Synthesis of Compound Having Formula (L5a)

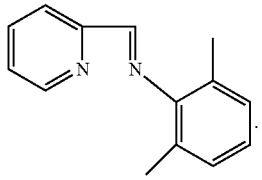

(L5a)

In a 500 ml flask, 2-pyridinecarboxaldehyde (26.8 g, 250 mmoles) and some drops of formic acid were added to a solution of 2 6-dimethylaniline (31 g, 250 mmoles) in methanol (250 ml): the mixture obtained was left, under stirring, at room temperature, for 24 hours. Subsequently, the mixture obtained was dried on sodium sulfate, filtered, and the solvent was removed by evaporation under vacuum: the residue obtained was washed with cold methanol, obtaining 47 g of an orange solid (yield=89%) corresponding to the compound having formula (L5a).

Elemental analysis [found (calculated for C$_{14}$H$_{14}$N$_2$)]: C: 80.00% (79.97%); H: 6.81% (6.71%); N: 13.71% (13.32%).

$^1$H-NMR (CDCl$_3$, δ ppm) 8.70 (d, 1H, HPy), 8.33 (s, 1H, CH=N), 8.23 (d, 1H, HPy), 7.82 (dt, 1H, HPy), 7.38 (ddd, 1H, HPy), 6.91-7.15 (m, 5H, Ar), 2.16 (s, 6H, Ar—CH$_3$).

5.2 Synthesis of Ligand Having Formula (L5)

18 g (85.6 mmoles) of the compound having formula (L5a) obtained as described above and 800 ml of anhydrous methanol were loaded into a 2 liter reactor, equipped with a stirrer: the whole was cooled to 0° C. and, subsequently sodium borohydride (24 g, 634 mmoles) was added, in small portions. The mixture obtained was left, under stirring, at room temperature, all night, and then switched off with brine and extracted with ethyl acetate. The solvent was then removed by distillation at reduced pressure and the residue obtained was purified through elution on a silica gel chromatography column [eluent: mixture of hexane/ethyl acetate in ratio of 9/1 (v/v)], and subsequently treated with cold ethyl ether, obtaining 9.15 g of a crystalline white solid (yield=50.4%) corresponding to the ligand having formula (L5).

GC-MS: M$^+$=m/z 212; [M-C$_6$H$_6$N]$^+$=m/z 120.

$^1$H-NMR (CDCl$_3$, δ ppm): 8.63 (d, 1H, PyH), 7.65 (dt, 1H, PyH), 7.27 (d, 1H, PyH), 7.20 (dd, 1H, PyH), 7.02 (d, 2H, ArH), 6.85 (m, 1H, ArH), 4.4 (broad s, 1H, NH), 4.31 (s, 2H, Py-CH2N), 2.35 (s, 6H, ArCH$_3$).

Example 6

Synthesis of Ligand Having Formula (L6)

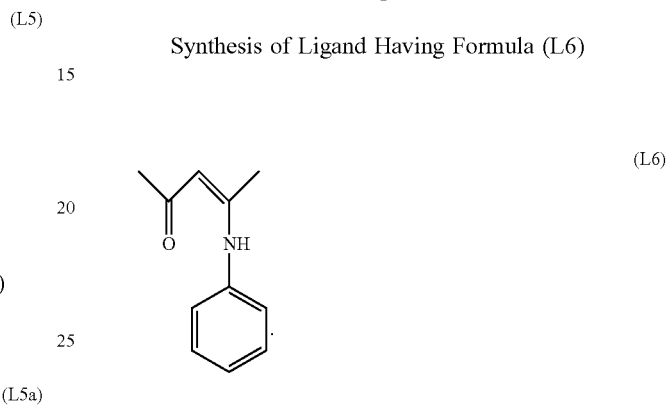

(L6)

In a 500 ml flask equipped with a Dean-Stark trap for the azeotropic removal of water, 5 g (50 mmoles) of 2,4-pentanedione were placed, together with 100 ml of methanol, some drops of formic acid and 4.66 g (50 mmoles) of aniline: the mixture obtained was heated to 85° C., for 4 hours. Subsequently, the mixture was cooled to room temperature, filtered on a porous septum and the filtrate obtained was evaporated under vacuum obtaining a solid product. Said solid product was dissolved in ethyl ether (40 ml) and placed in the freezer for 24 hours obtaining a precipitate. The precipitate obtained was recovered through filtration and dried, under vacuum, at room temperature, obtaining 7 g of a solid whitish product (yield=80%) having formula (L6).

Elemental analysis [found (calculated for C$_{11}$H$_{13}$NO)]: C: 75.20% (75.40%); H: 7.50% (7.48%); N: 8.00% (7.99%).

FT-IR (solid state, ATR, cm$^{-1}$): 1590; 1571.

$^1$H-NMR (CD$_2$Cl$_2$, δ ppm): 12.49 (s, 1H NH), 8.27 (d, 1H PyH), 7.34-7.28 (m, 2H ArH), 7.19-7.15 (m, 1H ArH), 7.10-7.08 (m, 2H ArH), 5.18 (s, 1H CH), 2.09 (s, 3H CH$_3$), 1.97 (s, 3H CH$_3$).

GC-MS: M$^+$=m/z 175.

Example 7

Synthesis of Ligand Having Formula (L7)

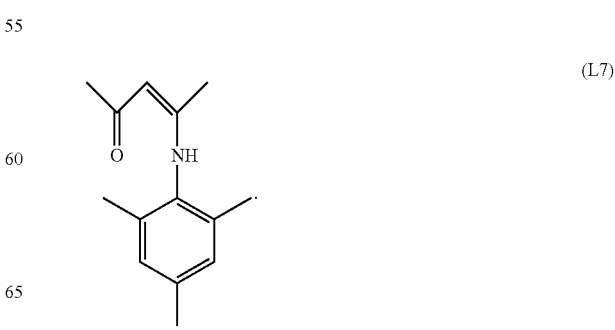

(L7)

In a 500 ml flask equipped with a Dean-Stark trap for the azeotropic removal of water, 5 g (50 mmoles) of 2,4-pentanedione were placed, together with 75 ml of benzene, some drops of hydrochloric acid and 6.76 g (50 mmoles) of 2,4,6-trimethylaniline: the mixture obtained was heated under reflux, for 24 hours. Subsequently, the mixture was cooled to room temperature, filtered on a porous septum and the filtrate obtained was evaporated under vacuum obtaining a solid product. Said solid product was dissolved in ethyl ether (10 ml) and placed in the freezer for 24 hours obtaining a precipitate. The precipitate obtained was recovered through filtration and dried, under vacuum, at room temperature, obtaining 4.8 g of a solid light yellow product (yield=44%) having formula (L7).

Elemental analysis [found (calculated for $C_{14}H_{19}NO$)]: C: 77.40% (77.38%); H: 9.00% (8.81%); N: 6.32% (6.45%).

FT-IR (solid state, ATR, $cm^{-1}$): 1606; 1567.

$^1$H-NMR ($CD_2Cl_2$, δ ppm): 1.61 (s, 3H $CH_3CN$), 2.05 (s, 3H $CH_3CO$), 2.18 (s, 6H 2-$C_6H_2CH_3$), 2.28 (s, 3H 4-$C_6H_2CH_3$), 5.21 (s, 1H CH), 6.92 (s, 2H $C_6H_2$), 11.82 (s, 1H NH).

GC-MS: $M^+$=m/z 217.

Example 8

Synthesis of Ligand Having Formula (L8)

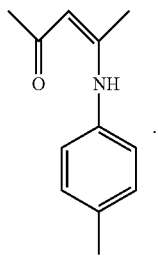

(L8)

In a 500 ml flask equipped with a Dean-Stark trap for the azeotropic removal of water, 5 g (50 mmoles) of 2,4-pentanedione were placed, together with 75 ml of benzene, some drops of hydrochloric acid and 5.35 g (50 mmoles) of p-toluidine: the mixture obtained was heated under reflux, for 24 hours. Subsequently, the mixture was cooled to room temperature, filtered on a porous septum and the filtrate obtained was evaporated under vacuum obtaining a solid product. Said solid product was dissolved in ethyl ether (10 ml) and placed in the freezer for 24 hours obtaining a precipitate. The precipitate obtained was recovered through filtration and dried, under vacuum, at room temperature, obtaining 5.7 g of a solid white product (yield=60%) having formula (L8).

Elemental analysis [found (calculated for $C_{12}H_{15}NO$)]: C: 76.13% (76.16%); H: 7.87% (7.99%); N: 7.36% (7.40%).

$^1$H-NMR ($CD_2Cl_2$, δ ppm): 1.93 (s, 3H, $CH_3$), 2.05 (s, 3H, $CH_3$), 2.31 (s, 3H, $CH_3$), 5.15 (s, 1H, CH), 6.98 (d, 2H, Ph), 7.13 (d, 2H, Ph), 12.38 (s, 1H, NH).

GC-MS: $M^+$=m/z 189.

Example 9

Synthesis of $TiCl_4(L2)$ [Sample BM2-211]

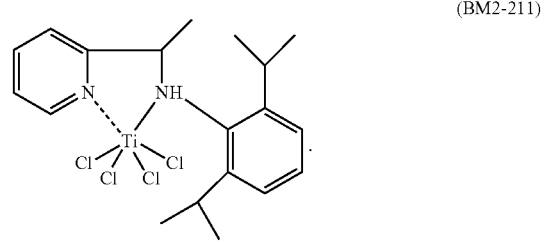

(BM2-211)

3.6 ml of a 0.5 M titanium tetrachloride ($TiCl_4$) solution in heptane (1.8 mmoles) were added, drop by drop, to a solution of 0.5 g of the ligand having formula (L2) (1.8 mmoles) obtained as described in Example 2, in heptane (15 ml), in a 100 ml tailed flask: the formation of an orange solid was immediately observed. The whole was left, under stirring, at room temperature, for 4 hours. The solid formed was recovered by filtration, washed with hexane (2×2 ml) and dried at reduced pressure, at room temperature, obtaining 0.76 g (yield=89%) of an orange microcrystalline solid product corresponding to the complex $TiCl_4(L2)$.

Elemental analysis [found (calculated for $C_{19}H_{26}Cl_4N_2Ti$)]: C: 48.00% (48.34%); H: 5.48% (5.55%); N: 5.75% (5.93%); Ti: 9.64% (10.14%); Cl: 29.01% (30.04%).

FIG. 1 shows the FT-IR spectrum (solid state—ATR) of the complex $TiCl_4(L2)$ obtained.

Figure 2:
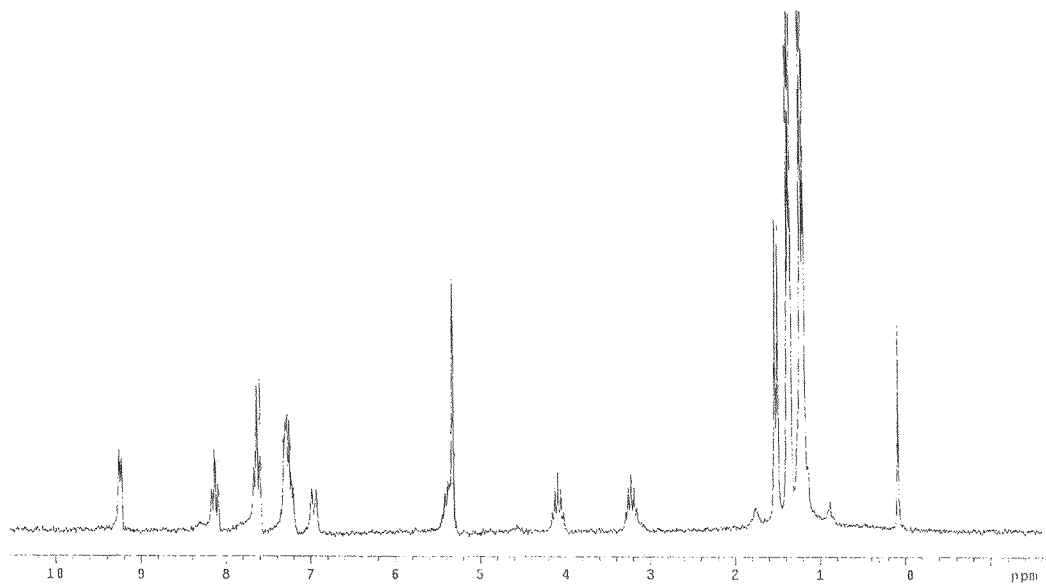
FIG. 2 shows the ¹H-NMR spectrum of the complex TiCl₄(L1) obtained in Example 9.

FIG. 2 shows the $^1$H-NMR spectrum of the complex $TiCl_4(L1)$ obtained.

Example 10

Synthesis of $TiCl_4(L1)$ [Sample BM2-217]

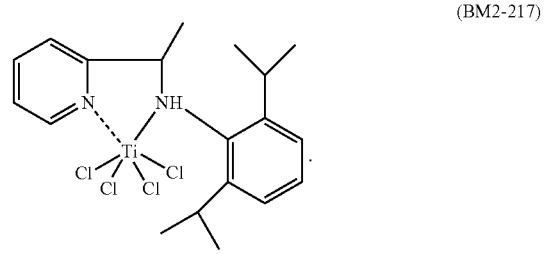

(BM2-217)

3.8 ml of a 0.5 M titanium tetrachloride ($TiCl_4$) solution in heptane (1.9 mmoles) were added, drop by drop, to a solution of 0.5 g of the ligand having formula (L1) (1.9 mmoles) obtained as described in Example 1, in heptane (20 ml), in a 100 ml tailed flask: the formation of an orange solid was immediately observed. The whole was left, under stirring, at room temperature, for 4 hours. The solid formed was recovered by filtration, washed with hexane (2×2 ml) and dried at reduced pressure, at room temperature, obtaining 0.76 g (yield=87%) of an orange microcrystalline solid product corresponding to the complex $TiCl_4(L1)$.

Elemental analysis [found (calculated for $C_{18}H_{24}Cl_4N_2Ti$)]: C: 47.12% (47.20%); H: 5.15% (5.28%); N: 5.97% (6.12%); Ti: 9.84% (10.45%); Cl: 29.76% (30.96%).

Figure 3:
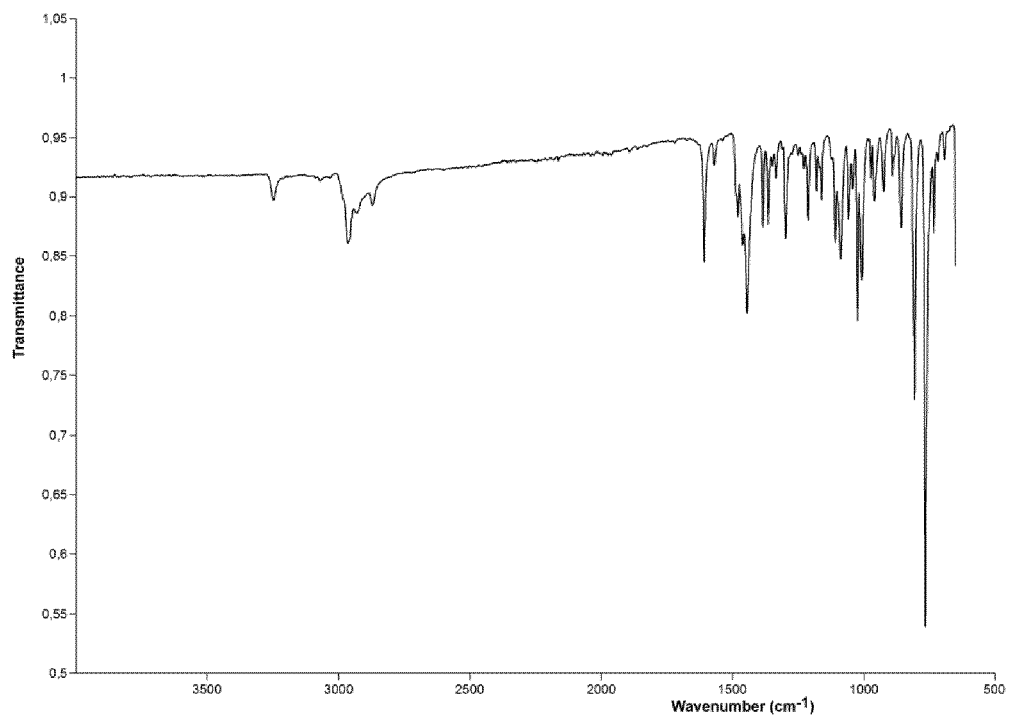
FIG. 3 shows the FT-IR spectrum (solid state—ATR) of the complex TiCl₄(L1) obtained in Example 10.

FIG. 3 shows the FT-IR spectrum (solid state—ATR) of the complex TiCl$_4$(L1) obtained.

Figure 4:
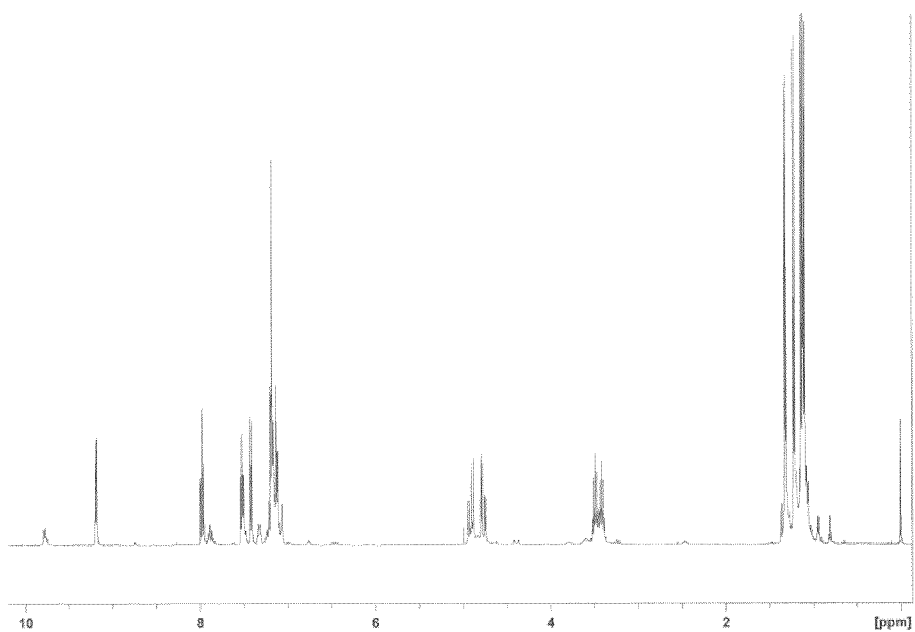
FIG. 4 shows the ¹H-NMR spectrum of the complex TiCl₄(L1) obtained in Example 10.

FIG. 4 shows the $^1$H-NMR spectrum of the complex TiCl$_4$(L1) obtained.

Example 11

Synthesis of TiCl$_3$(L1) [Sample BM2-227]

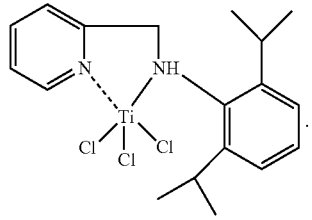

(BM2-227)

1.5 ml of a 0.5 M titanium tetrachloride (TiCl$_4$) solution in heptane (0.75 mmoles) were added to a solution of 0.2 g of the ligand having formula (L1) (0.74 mmoles) obtained as described in Example 1, in heptane (30 ml), in a 50 ml tailed flask: the mixture obtained was left, under stirring, at room temperature, for 30 minutes and, subsequently, heated under reflux, for 4 hours. The solid formed was recovered by filtration, washed with heptane (2×2 ml) and dried at reduced pressure, at room temperature, obtaining 0.29 g (yield=83%) of a yellow microcrystalline solid product corresponding to the complex TiCl$_3$(L1).

Elemental analysis [found (calculated for C$_{18}$H$_{23}$Cl$_3$N$_2$Ti)]: C: 51.12% (51.28%); H: 5.35% (5.50%); N: 6.40% (6.64%); Ti: 10.84% (11.35%); Cl: 24.12% (25.23%).

Figure 5:
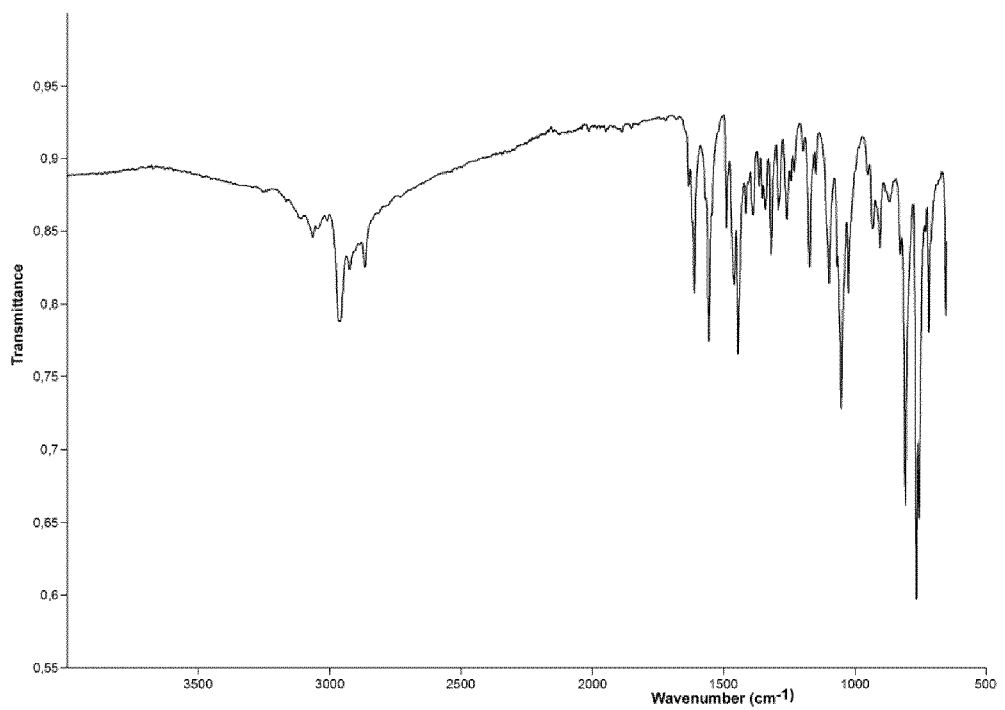
FIG. 5 shows the FT-IR spectrum (solid state—ATR) of the complex TiCl₄(L1) obtained in Example 11.

FIG. 5 shows the FT-IR spectrum (solid state—ATR) of the complex TiCl$_4$(L1) obtained.

Figure 6:
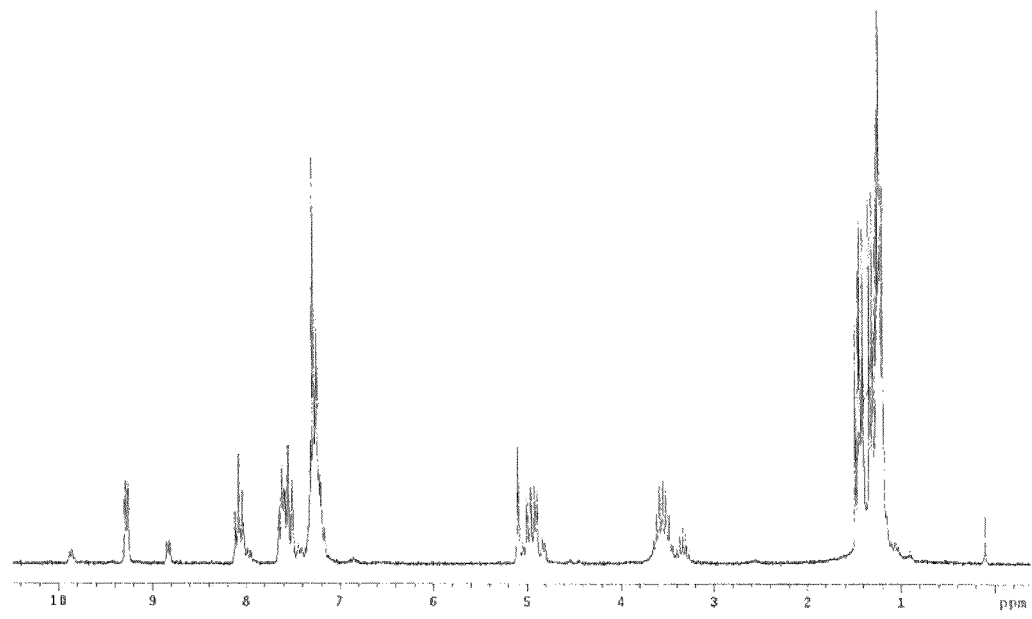
FIG. 6 shows the ¹H-NMR spectrum of the complex TiCl₄(L1) obtained in Example 11.

FIG. 6 shows the $^1$H-NMR spectrum of the complex TiCl$_4$(L1) obtained.

Example 12

Synthesis of TiCl$_3$(L4) [Sample MT-11]

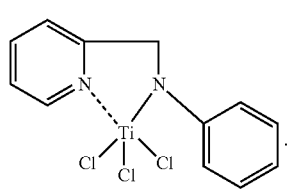

(MT-11)

1.37 ml of a 0.8 M titanium tetrachloride (TiCl$_4$) solution in heptane (1.10 mmoles) were added, drop by drop, to a solution of 0.2 g of the ligand having formula (L4) (1.16 mmoles) obtained as described in Example 4, in heptane (20 ml), in a 100 ml tailed flask: the formation of a purple solid was immediately observed. The whole was left, under stirring, at reflux temperature, for 3 hours and then brought to room temperature obtaining a beige suspension. The solid formed was recovered by filtration, washed with hexane (2×3 ml) and dried at reduced pressure, at room temperature, obtaining 0.18 g (yield=48%) of a beige microcrystalline solid product corresponding to the complex TiCl$_3$(L4).

Elemental analysis [found (calculated for C$_{12}$H$_{1}$Cl$_3$N$_2$Ti)]: C: 42.73% (42.71%); H: 3.32% (3.29%); N: 8.27% (8.30%); Ti: 13.52% (14.18%); Cl: 30.97% (31.52%).

Figure 7:
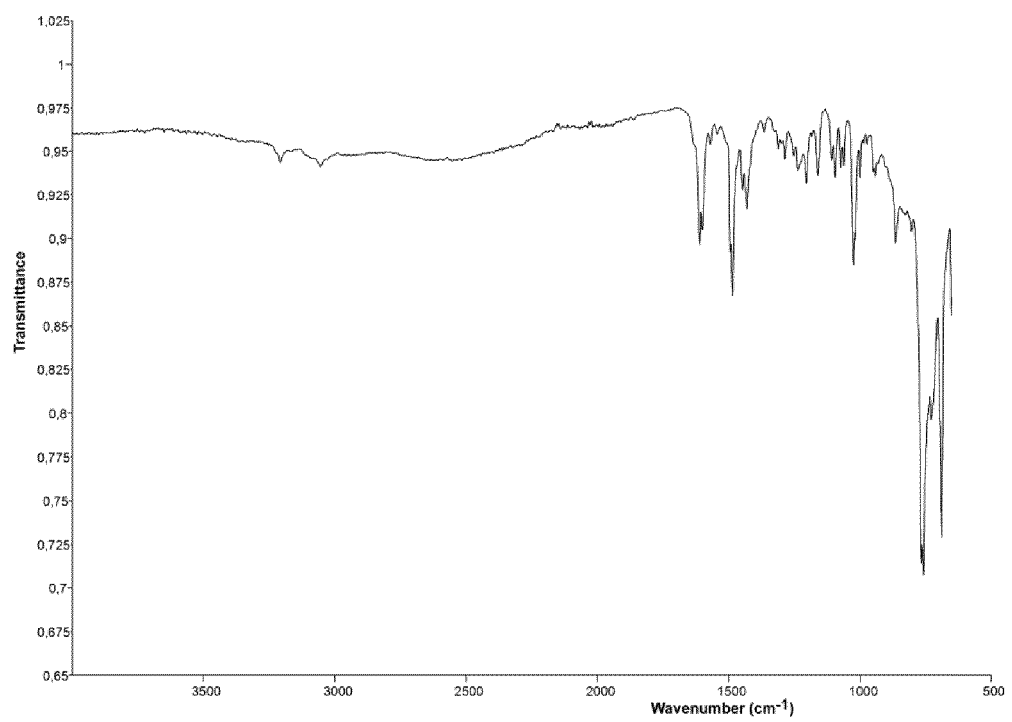
FIG. 7 shows the FT-IR spectrum (solid state—ATR) of the complex TiCl₃(L4) obtained in Example 12.

FIG. 7 shows the FT-IR spectrum (solid state—ATR) of the complex TiCl$_3$(L4) obtained.

Example 13

Synthesis of TiCl$_3$(L3) [Sample MT-27]

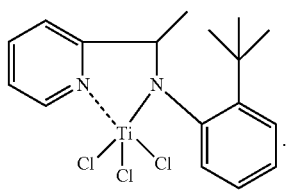

(MT-27)

1.09 ml of a 0.8 M titanium tetrachloride (TiCl$_4$) solution in heptane (0.872 mmoles) were added, drop by drop, to a solution of 0.2 g of the ligand having formula (L3) (0.786 mmoles) obtained as described in Example 3, in heptane (20 ml), in a 100 ml tailed flask: the formation of an orange solid was immediately observed. The whole was left, under stirring, at reflux temperature, for 3 hours and then brought to room temperature obtaining an orange suspension. The solid formed was recovered by filtration, washed with hexane (2×3 ml) and dried at reduced pressure, at room temperature, obtaining 0.18 g (yield=56%) of an orange solid product corresponding to the complex TiCl$_3$(L3).

Elemental analysis [found (calculated for C$_{17}$H$_{21}$Cl$_3$N$_2$Ti)]: C: 49.91% (50.09%); H: 5.00% (5.19%); N: 6.66% (6.87%); Ti: 10.95% (11.74%); Cl: 25.21% (26.09%).

Example 14

Synthesis of TiCl$_3$(L5) [Sample MT-32]

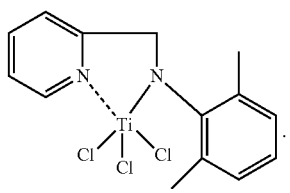

(MT-32)

1.0 ml of a 0.8 M titanium tetrachloride (TiCl$_4$) solution in heptane (0.80 mmoles) were added, drop by drop, to a solution of 0.167 g of the ligand having formula (L5) (0.787 mmoles) obtained as described in Example 5, in heptane (20 ml), in a 100 ml tailed flask: the formation of an orange solid was immediately observed. The whole was left, under stirring, at reflux temperature, for 3 hours and then brought to room temperature obtaining a brown suspension. The solid formed was recovered by filtration, washed with hexane (2×3 ml) and dried at reduced pressure, at room temperature, obtaining 0.27 g (yield=94%) of a brown solid product corresponding to the complex TiCl$_3$(L5).

Elemental analysis [found (calculated for C$_{14}$H$_{15}$Cl$_3$N$_2$Ti)]: C: 45.33% (46.00%); H: 3.90% (4.14%); N: 7.45% (7.66%); Ti: 12.45% (13.10%); Cl: 28.32% (29.10%).

Example 15

Synthesis of TiCl$_2$(THF)(L1) [Sample MT-22]

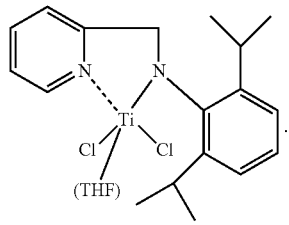

(MT-22)

0.307 g of the titanium trichloride complex:tetrahydrofuran (1:3) [TiCl$_3$(THF)$_3$] (0.829 mmoles) were added, drop by drop, to a solution of 0.222 g of the ligand having formula (L1) (0.827 mmoles) obtained as described in Example 1, in toluene (20 ml), in a 100 ml tailed flask: the formation of a dark green suspension was immediately observed. The whole was left, under stirring, at reflux temperature, for 3 hours and then brought to room temperature obtaining a brown suspension. The solid formed was recovered by filtration, washed with hexane (2×3 ml) and dried at reduced pressure, at room temperature, obtaining 0.19 g (yield=59%) of a brown solid product corresponding to the complex TiCl$_2$(THF)(L5).

Elemental analysis [found (calculated for C$_{18}$H$_{23}$Cl$_2$N$_2$Ti)]: C: 55.37% (55.98%); H: 5.75% (6.00%); N: 7.00% (7.25%); Ti: 12.02% (12.40%); Cl: 18.97% (18.36%).

Example 16

Synthesis of TiCl$_2$(THF)(L6) [sample GT-341]

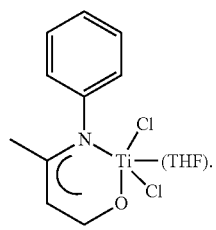

(GT341)

1.7 ml of a 1.6 M n-butyl lithium solution in hexane (2.72 mmoles) were added, drop by drop, at −78° C., to a suspension of 0.471 g of the ligand having formula (L6) (2.69 mmoles) obtained as described in Example 6, in toluene (20 ml), in a 50 ml tailed flask, obtaining a yellow mixture. The whole was brought to room temperature and left, at said temperature, under stirring, for 5 hours. Subsequently, 0.991 g of the titanium trichloride complex:tetrahydrofuran (1:3) [TiCl$_3$(THF)$_3$] (2.67 mmoles) were added: the suspension obtained was left to react, under stirring, for 15 hours, at room temperature. The solid formed was recovered by filtration, washed with hexane (2×5 ml) and dried under vacuum, at room temperature, obtaining 0.738 g (yield=82%) of a dark brown solid product corresponding to the complex TiCl$_2$(THF)(L6).

Elemental analysis [found (calculated for C$_{11}$H$_{12}$Cl$_2$NOTi)]: C: 50.00% (49.35%); H: 5.25% (5.52%); N: 3.70% (3.84%); Ti: 13.78% (13.11%); Cl: 19.91% (19.42%).

Figure 8:
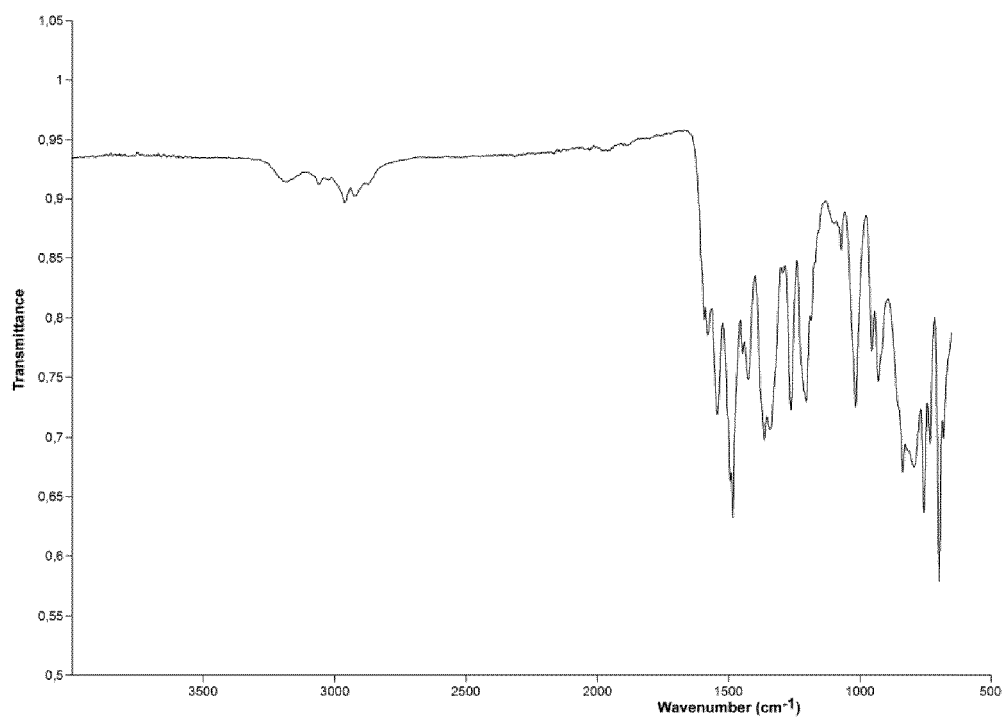
FIG. 8 shows the FT-IR spectrum (solid state—ATR) of the complex TiCl₂(THF)(L6) obtained in Example 16.

FIG. 8 shows the FT-IR spectrum (solid state—ATR) of the complex TiCl$_2$(THF)(L6) obtained.

Example 17

Synthesis of TiCl$_2$(THF)(L7) [Sample GT-342]

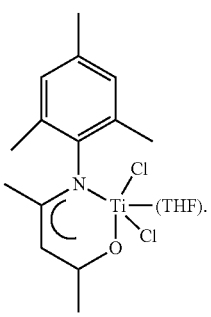

(GT-342)

1.6 ml of a 1.6 M n-butyl lithium solution in hexane (2.56 mmoles) were added, drop by drop, at −78° C., to a suspension of 0.561 g of the ligand having formula (L7) (2.58 mmoles) obtained as described in Example 7, in toluene (20 ml), in a 50 ml tailed flask, obtaining a yellow mixture. The whole was brought to room temperature and left, at said temperature, under stirring, for 5 hours. Subsequently, 0.955 g of the titanium trichloride complex:tetrahydrofuran (1:3) [TiCl$_3$(THF)$_3$] (2.58 mmoles) were added: the suspension obtained was left to react, under stirring, for 15 hours, at room temperature. The solid formed was recovered by filtration, washed with hexane (2×5 ml) and dried under vacuum, at room temperature, obtaining 0.873 g (yield=89%) of a dark brown solid product corresponding to the complex TiCl$_2$(THF)(L7).

Elemental analysis [found (calculated for C$_{14}$H$_{18}$Cl$_2$NOTi)]: C: 52.04% (53.09%); H: 6.01% (6.44%); N: 3.05% (3.44%); Ti: 10.84% (11.76%); Cl: 17.87% (17.41%).

Figure 9:
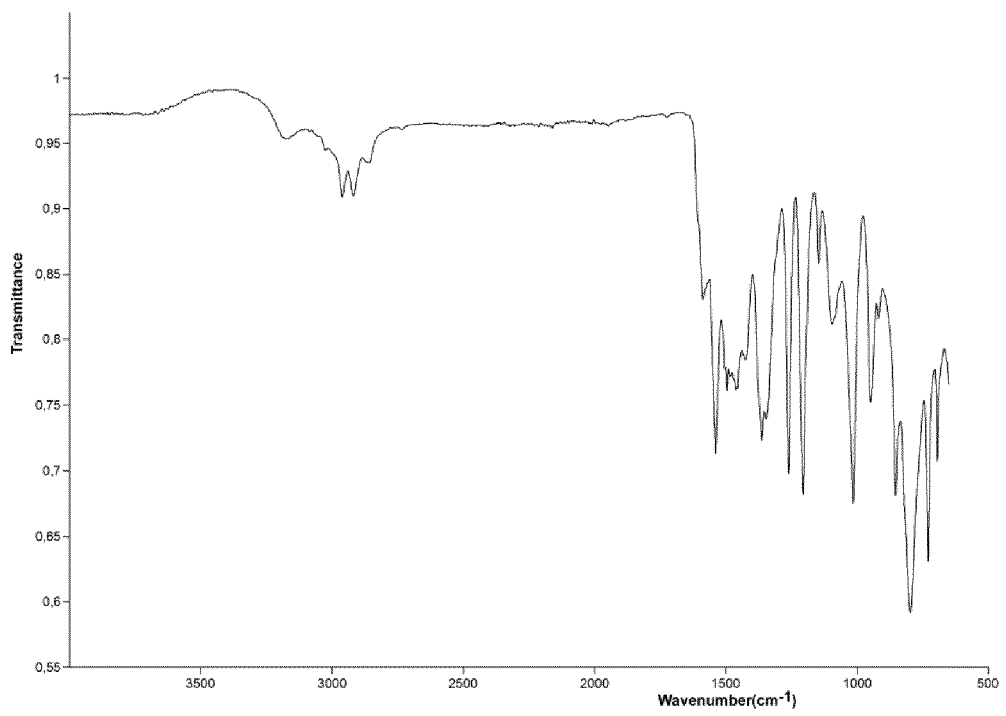
FIG. 9 shows the FT-IR spectrum (solid state—ATR) of the complex TiCl₂(THF)(L7) obtained in Example 17.

FIG. 9 shows the FT-IR spectrum (solid state—ATR) of the complex TiCl2(THF)(L7) obtained.

Example 18

Synthesis of TiCl$_2$(L6)$_2$ [Sample GT-347]

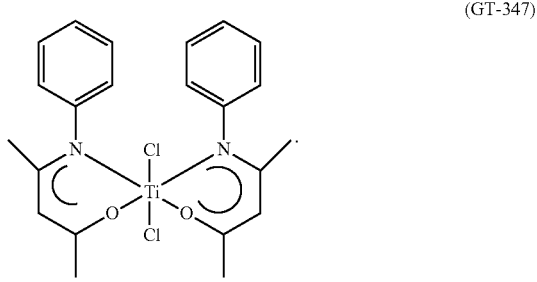

(GT-347)

2.0 ml of a 1.6 M n-butyl lithium solution in hexane (3.20 mmoles) were added, drop by drop, at −78° C., to a suspension of 0.563 g of the ligand having formula (L6) (3.21 mmoles) obtained as described in Example 1, in heptane (20 ml), in a 50 ml tailed flask, obtaining a yellow mixture. The whole was brought to room temperature and left, at said temperature, under stirring, for 5 hours. Subsequently, 3.1 ml of a 0.51 M solution of titanium tetrachloride (TiCl$_4$) in heptane (1.58 mmoles) were added, drop by drop, at 0° C.: the suspension obtained was left to react, under stirring, for 15 hours, at room temperature. The solid formed was recovered by filtration, washed with hexane (2×5 ml) and dried under vacuum, at room temperature, obtaining 0.732 g (yield=90%) of a dark brown solid product corresponding to the complex TiCl$_2$(L6)$_2$.

Elemental analysis [found (calculated for C$_{22}$H$_{24}$Cl$_4$NOTi)]: C: 56.95% (56.56%); H: 5.25% (5.18%); N: 5.90% (6.00%); Ti: 10.45% (10.25%); Cl: 15.87% (15.18%).

Figure 10:
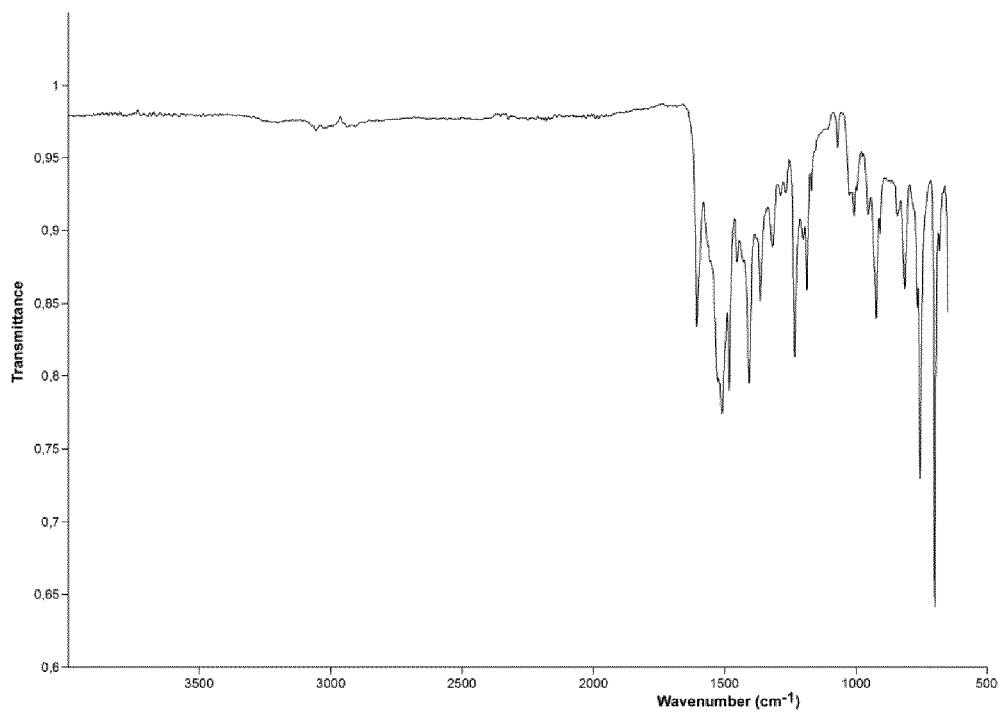
FIG. 10 shows the FT-IR spectrum (solid state—ATR) of the complex TiCl₂(L6) obtained in Example 18.

FIG. 10 shows the FT-IR spectrum (solid state—ATR) of the complex TiCl$_2$(L6) obtained.

Example 19

Synthesis of TiCl$_2$(L7)$_2$ [Sample GT-348]

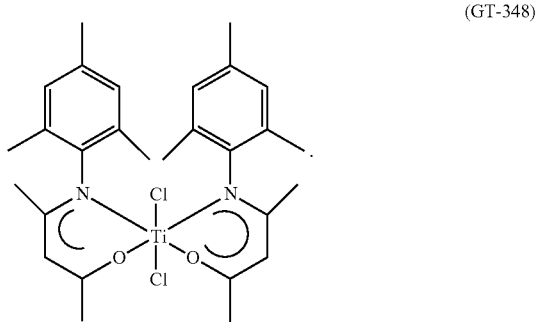

(GT-348)

2.0 ml of a 1.6 M n-butyl lithium solution in hexane (3.20 mmoles) were added, drop by drop, at −78° C., to a suspension of 0.696 g of the ligand having formula (L7) (3.20 mmoles) obtained as described in Example 7, in heptane (20 ml), in a 50 ml tailed flask, obtaining a yellow mixture. The whole was brought to room temperature and left, at said temperature, under stirring, for 5 hours. Subsequently, 3.1 ml of a 0.51 M solution of titanium tetrachloride (TiCl$_4$) in heptane (1.58 mmoles) were added, drop by drop, at 0° C.: the suspension obtained was left to react, under stirring, for 15 hours, at room temperature. The solid formed was recovered by filtration, washed with hexane (2×5 ml) and dried under vacuum, at room temperature, obtaining 0.743 g (yield=74%) of a dark brown solid product corresponding to the complex TiCl$_2$(L7)$_2$.

Elemental analysis [found (calculated for C$_{28}$H$_{38}$Cl$_4$NOTi)]: C: 59.00% (60.99%); H: 6.0% (6.58%); N: 4.99% (5.08%); Ti: 7.99% (8.68%); Cl: 12.74% (12.86%).

Figure 11:
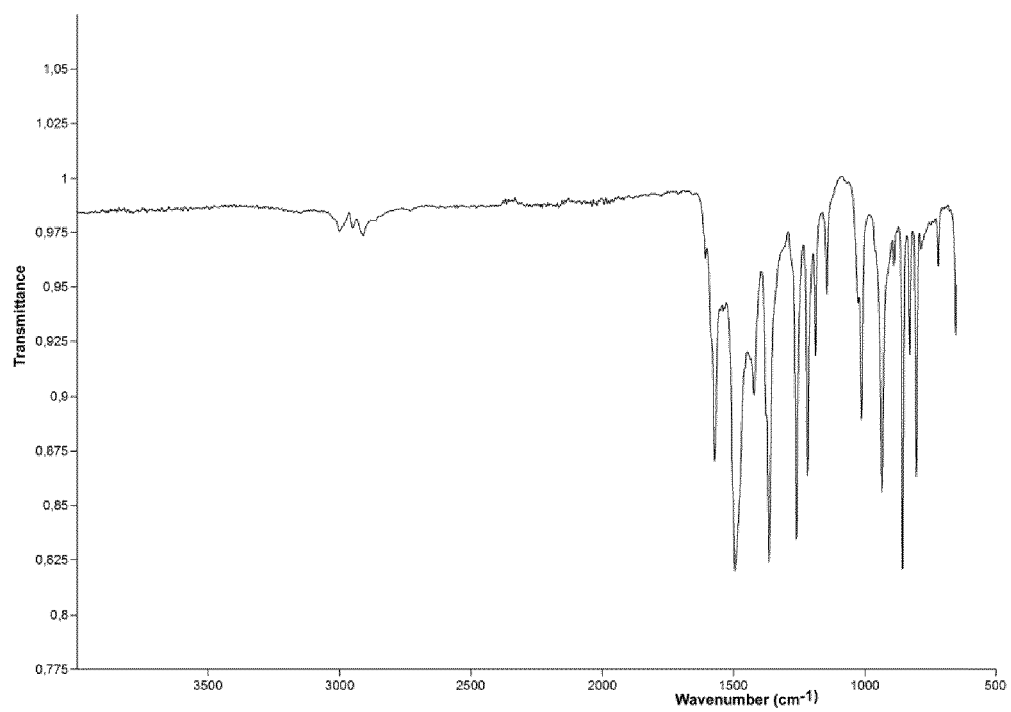
FIG. 11 shows the FT-IR spectrum (solid state—ATR) of the complex TiCl₂(L7) obtained in Example 19.

FIG. 11 shows the FT-IR spectrum (solid state—ATR) of the complex TiCl$_2$(L7) obtained.

Example 20 (GL960)

2 ml of 1,3-butadiene equal to about 1.4 g were condensed, cold (−20° C.) in a 25 ml test tube. Subsequently, 7.5 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_4$(L2) complex [sample BM2-211] (2.18 ml of toluene suspension at a concentration equal to 2 mg/ml; 1×10$^{-5}$ moles, equal to about 4.36 mg) obtained as described in Example 9. The whole was kept under magnetic stirring, at 20° C., for 60 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.270 g of polybutadiene with a prevalently 1,4-cis structure having a 1,4-cis unit content equal to 82.2%: further characteristics of the procedure and of the polybutadiene obtained are reported in Table 1.

Figure 12:
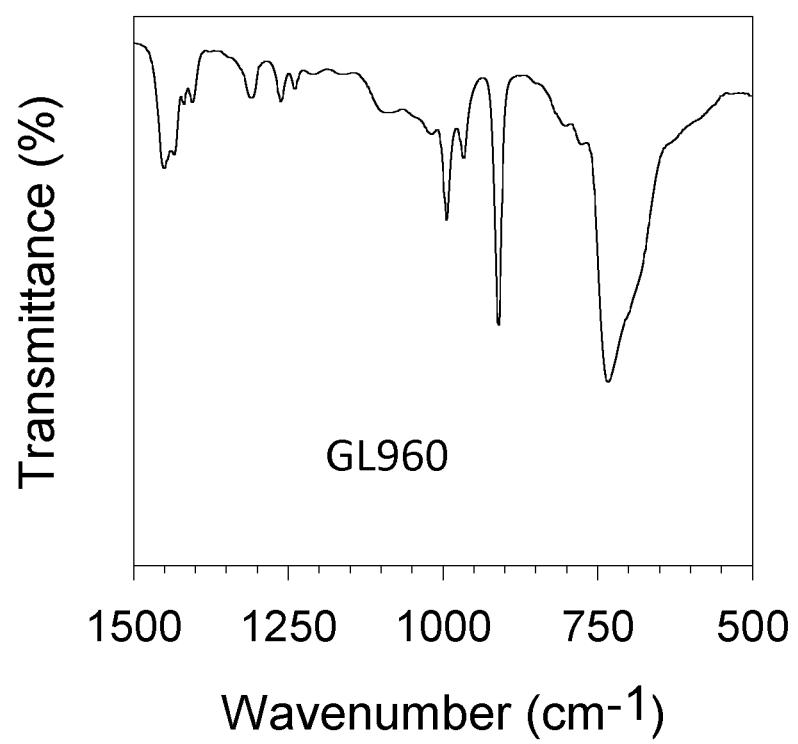
FIG. 12 shows the FT-IR spectrum of the polybutadiene obtained in Example 20.

FIG. 12 shows the FT-IR spectrum of the polybutadiene obtained.

Example 21 (GL981)

2 ml of 1,3-butadiene equal to about 1.4 g were condensed, cold (−20° C.) in a 25 ml test tube. Subsequently, 7.4 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_3$(L1) complex [sample BM2-227] (2.32 ml of toluene suspension at a concentration equal to 2 mg/ml; 1×10$^{-5}$ moles, equal to about 4.64 mg) obtained as described in Example 11. The whole was kept under magnetic stirring, at 20° C., for 7 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.601 g of polybutadiene with a prevalently 1,4-cis structure having a 1,4-cis unit content equal to 82.5%: further characteristics of the procedure and of the polybutadiene obtained are reported in Table 1.

Figure 13:
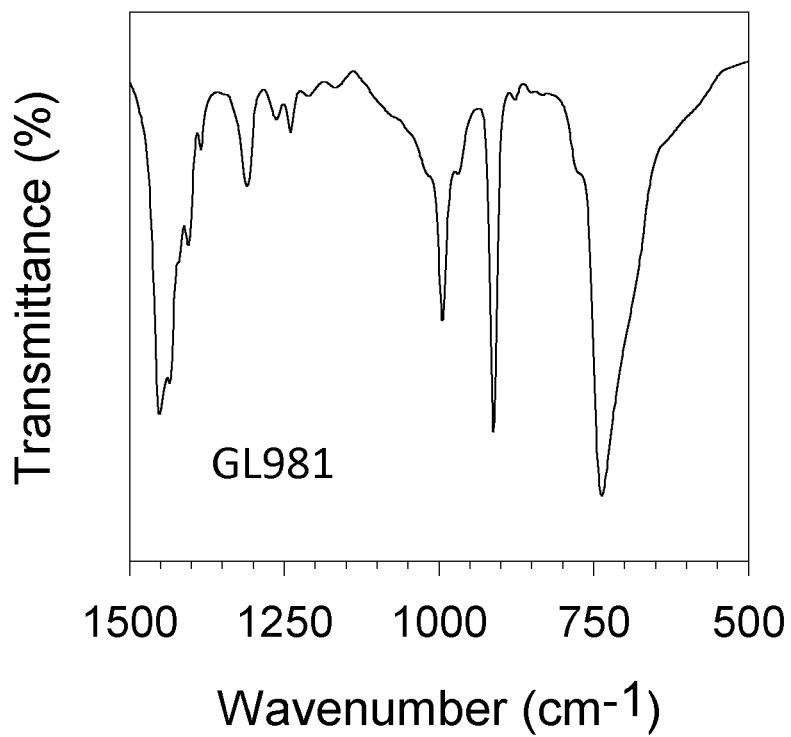
FIG. 13 shows the FT-IR spectrum of the polybutadiene obtained in Example 21.

FIG. 13 shows the FT-IR spectrum of the polybutadiene obtained.

Figure 14:
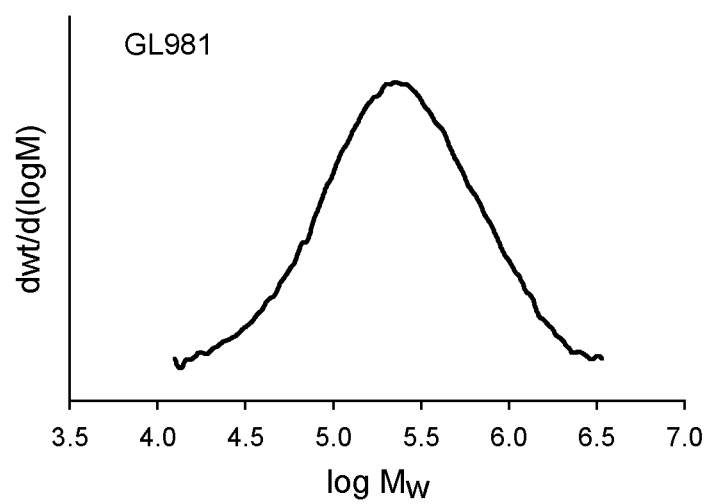
FIG. 14 shows the GPC diagram of the polybutadiene obtained in Example 21.

FIG. 14 shows the GPC diagram of the polybutadiene obtained.

Figure 15:
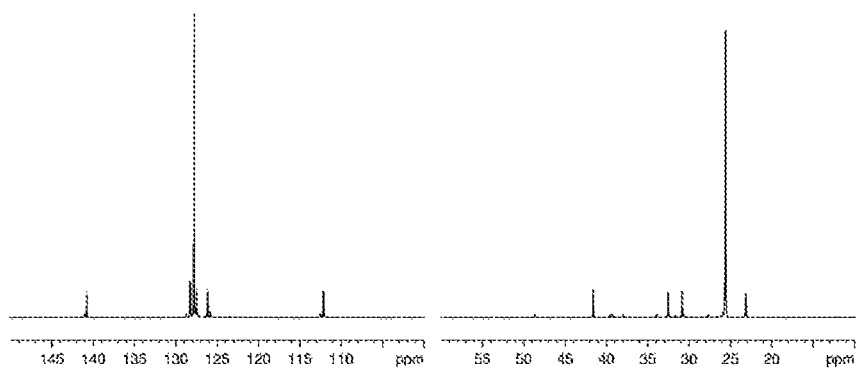
FIG. 15 shows the ¹H-NMR (bottom) and ¹³C-NMR (top) spectra of the polybutadiene obtained in Example 21.

FIG. 15 shows the $^1$H-NMR (bottom) and $^{13}$C-NMR (top) spectra of the polybutadiene obtained.

Example 22 (G1109)

2 ml of 1,3-butadiene equal to about 1.4 g were condensed, cold (−20° C.) in a 25 ml test tube. Subsequently, 8.02 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $TiCl_3(L4)$ complex [sample MT-11] (1.68 ml of toluene suspension at a concentration equal to 2 mg/ml; $1\times10^{-5}$ moles, equal to about 3.36 mg) obtained as described in Example 12. The whole was kept under magnetic stirring, at 20° C., for 65 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.719 g of polybutadiene with a prevalently 1,4-cis structure having a 1,4-cis unit content equal to 87.1%: further characteristics of the procedure and of the polybutadiene obtained are reported in Table 1.

Figure 16:
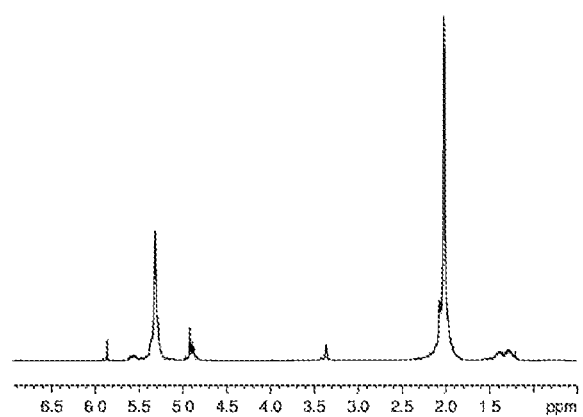
FIG. 16 shows the FT-IR spectrum of the polybutadiene obtained in Example 22.
Figure 16:
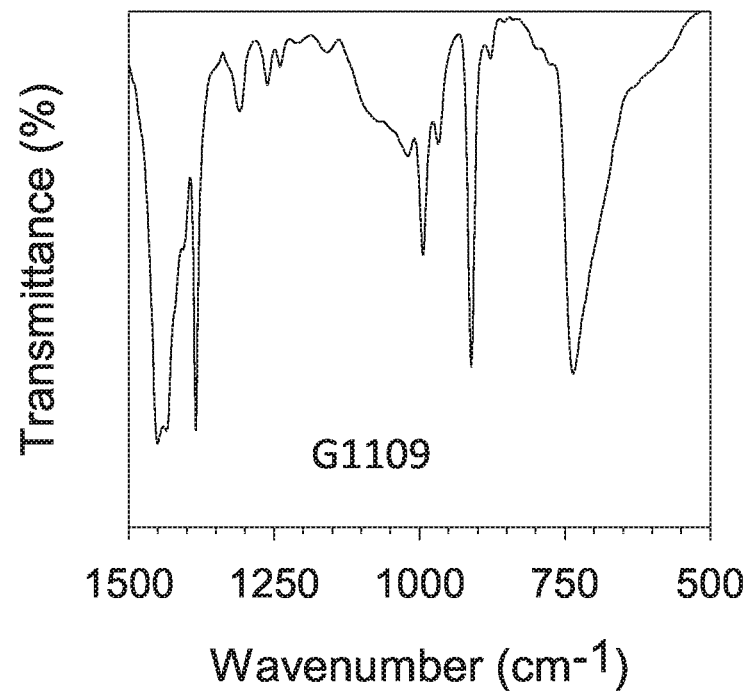

FIG. 16 shows the FT-IR spectrum of the polybutadiene obtained.

Example 23 (G1108)

2 ml of 1,3-butadiene equal to about 1.4 g were condensed, cold (−20° C.) in a 25 ml test tube. Subsequently, 7.66 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $TiCl_3(L3)$ complex [sample MT-27] (2.04 ml of toluene suspension at a concentration equal to 2 mg/ml; $1\times10^{-5}$ moles, equal to about 4.08 mg) obtained as described in Example 12. The whole was kept under magnetic stirring, at 20° C., for 135 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.562 g of polybutadiene with a prevalently 1,4-cis structure having a 1,4-cis unit content equal to 81.2%: further characteristics of the procedure and of the polybutadiene obtained are reported in Table 1.

Figure 17:
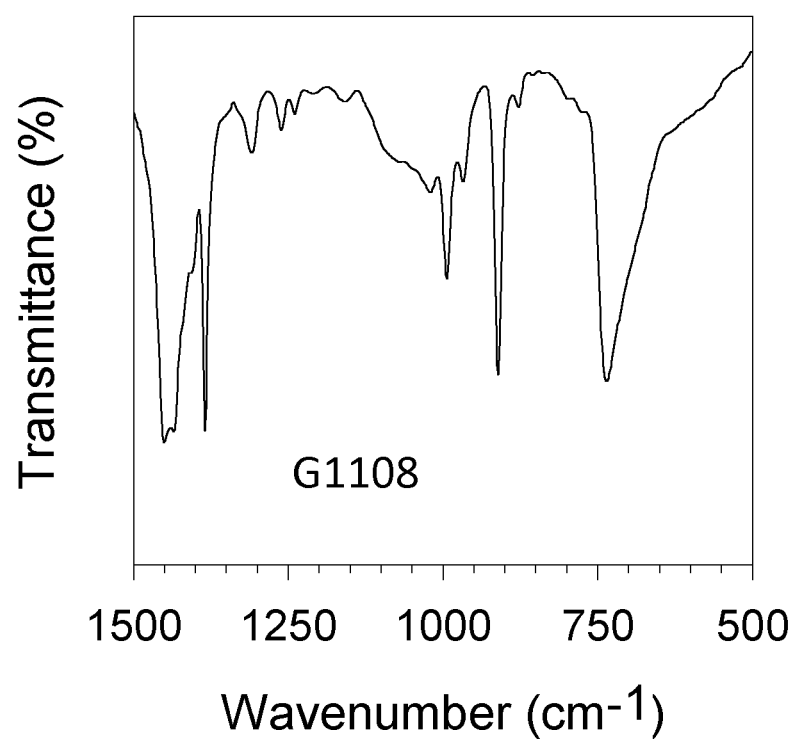
FIG. 17 shows the FT-IR spectrum of the polybutadiene obtained in Example 23.

FIG. 17 shows the FT-IR spectrum of the polybutadiene obtained.

Example 24 (G1084)

2 ml of 1,3-butadiene equal to about 1.4 g were condensed, cold (−20° C.) in a 25 ml test tube. Subsequently, 7.88 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $TiCl_3(L5)$ complex [sample MT-32] (1.82 ml of toluene suspension at a concentration equal to 2 mg/ml; $1\times10^{-5}$ moles, equal to about 3.64 mg) obtained as described in Example 14. The whole was kept under magnetic stirring, at 20° C., for 7 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.424 g of polybutadiene with a prevalently 1,4-cis structure having a 1,4-cis unit content equal to 84.1%: further characteristics of the procedure and of the polybutadiene obtained are reported in Table 1.

Figure 18:
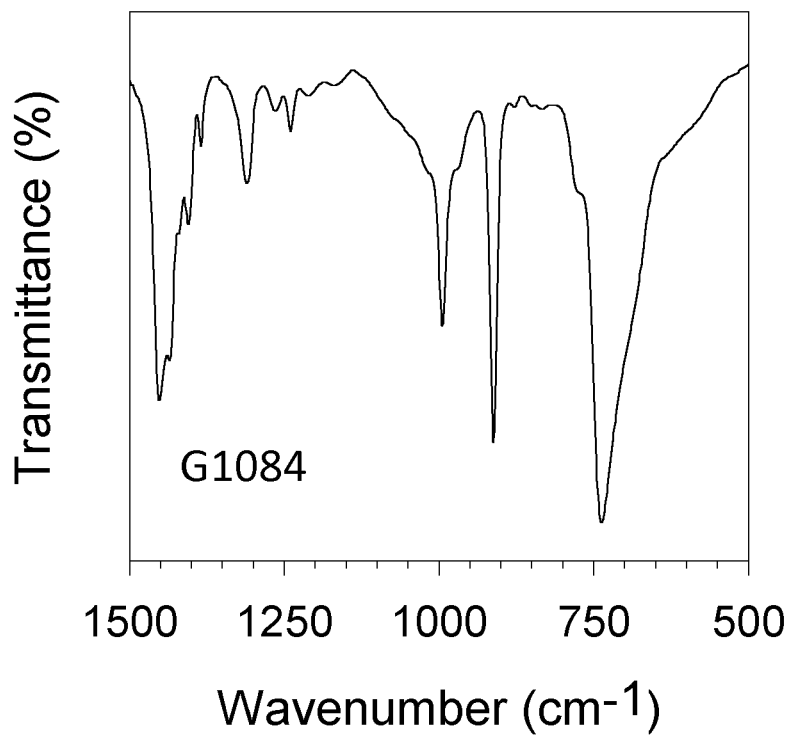
FIG. 18 shows the FT-IR spectrum of the polybutadiene obtained in Example 24.

FIG. 18 shows the FT-IR spectrum of the polybutadiene obtained.

Figure 19:
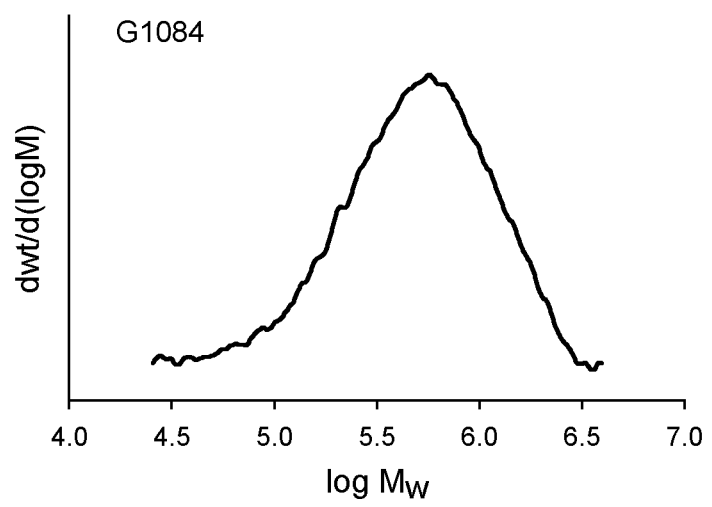
FIG. 19 shows the GPC diagram of the polybutadiene obtained in Example 24.

FIG. 19 shows the GPC diagram of the polybutadiene obtained.

Example 25 (G1085)

2 ml of 1,3-butadiene equal to about 1.4 g were condensed, cold (−20° C.) in a 25 ml test tube. Subsequently, 7.8 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $TiCl_2$(THF)(L1) complex [sample MT-22] (1.89 ml of toluene suspension at a concentration equal to 2 mg/ml; $1\times10^{-5}$ moles, equal to about 3.78 mg) obtained as described in Example 15. The whole was kept under magnetic stirring, at 20° C., for 5 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene with a prevalently 1,4-cis structure having a 1,4-cis unit content equal to 84.4%: further characteristics of the procedure and of the polybutadiene obtained are reported in Table 1.

Figure 20:
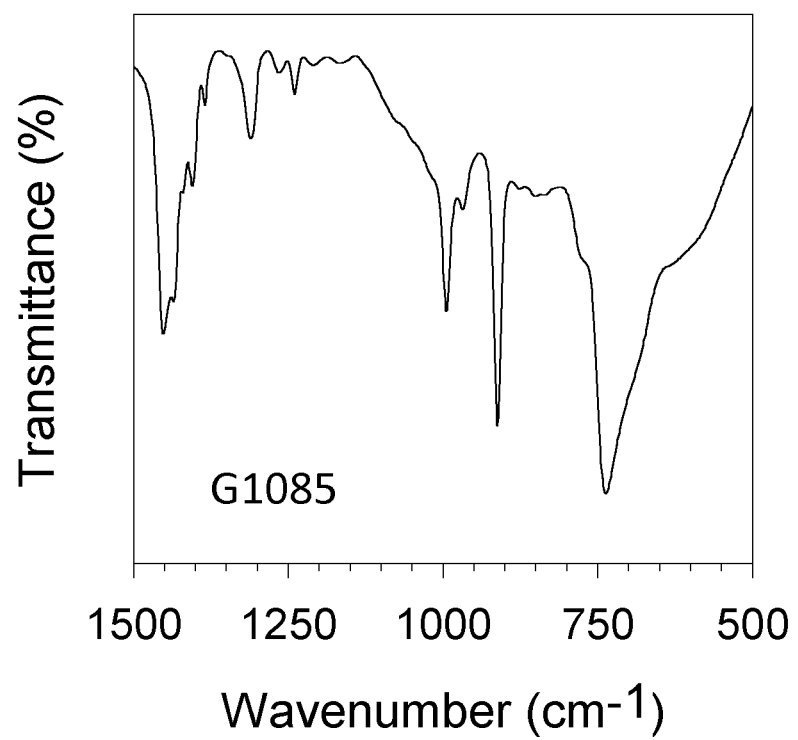
FIG. 20 shows the FT-IR spectrum of the polybutadiene obtained in Example 25.

FIG. 20 shows the FT-IR spectrum of the polybutadiene obtained.

Example 26 (IP2)

2 ml of 1,3-butadiene equal to about 1.4 g were condensed, cold (−20° C.) in a 25 ml test tube. Subsequently, 7.8 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $TiCl_2$(THF)(L6) complex [sample GT-341] (1.68 ml of toluene suspension at a concentration of 2 mg/ml; $1\times10^{-5}$ moles, equal to about 3.36 mg) obtained as described in Example 16. The whole was kept under magnetic stirring, at 20° C., for 1080 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.294 g of polybutadiene with a prevalently 1,4-cis structure having a 1,4-cis unit content of 81.1%: further characteristics of the procedure and of the polybutadiene obtained are reported in Table 1.

Figure 21:
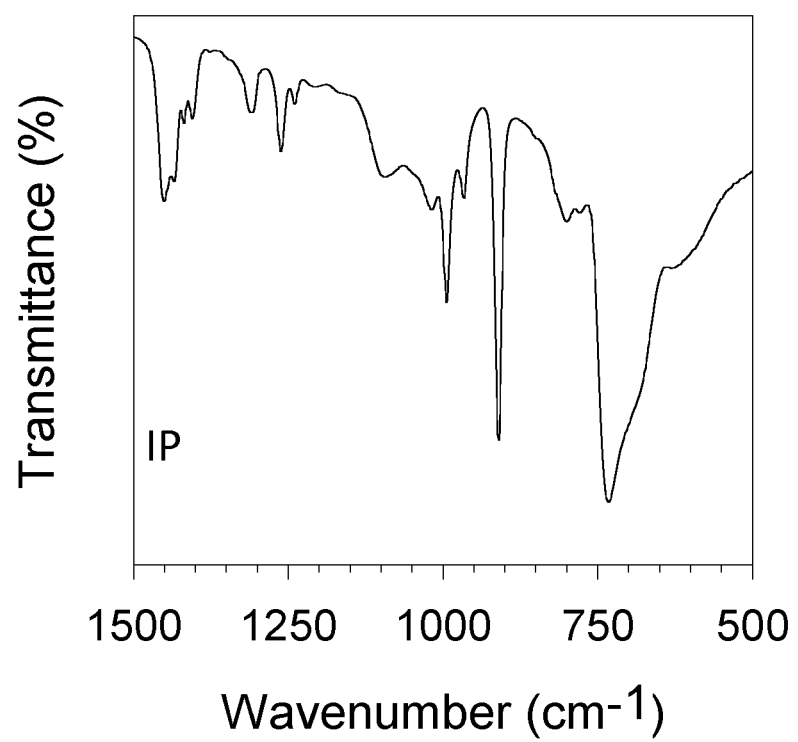
FIG. 21 shows the FT-IR spectrum of the polybutadiene obtained in Example 26.

FIG. 21 shows the FT-IR spectrum of the polybutadiene obtained.

Figure 22:
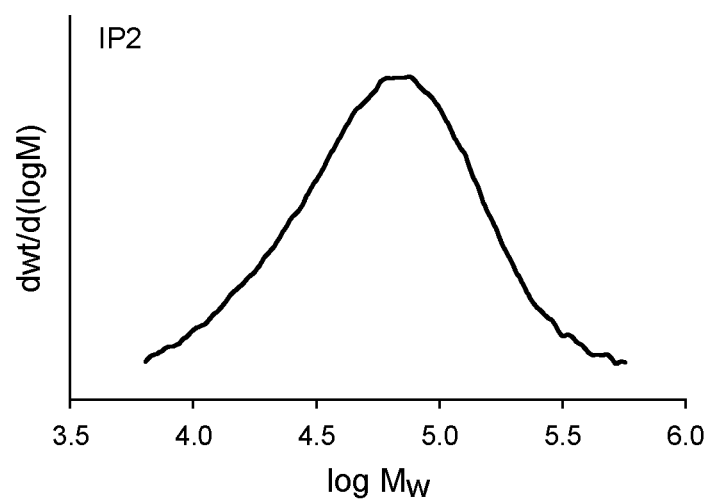
FIG. 22 shows the GPC diagram of the polybutadiene obtained in Example 26.

FIG. 22 shows the GPC diagram of the polybutadiene obtained.

Example 27 (IP3)

2 ml of 1,3-butadiene equal to about 1.4 g were condensed, cold (−20° C.) in a 25 ml test tube. Subsequently, 7.8 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $TiCl_2$(THF)(L7) complex [sample GT-342] (1.89 ml of toluene suspension at a concentration equal to 2 mg/ml; $1\times10^{-5}$ moles, equal to about 3.78 mg) obtained as described in Example 17. The whole was kept under magnetic stirring, at 20° C., for 1080 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.379 g of polybutadiene with a prevalently 1,4-cis structure having a 1,4-cis unit content equal to 82.2%: further characteristics of the procedure and of the polybutadiene obtained are reported in Table 1.

Figure 23:
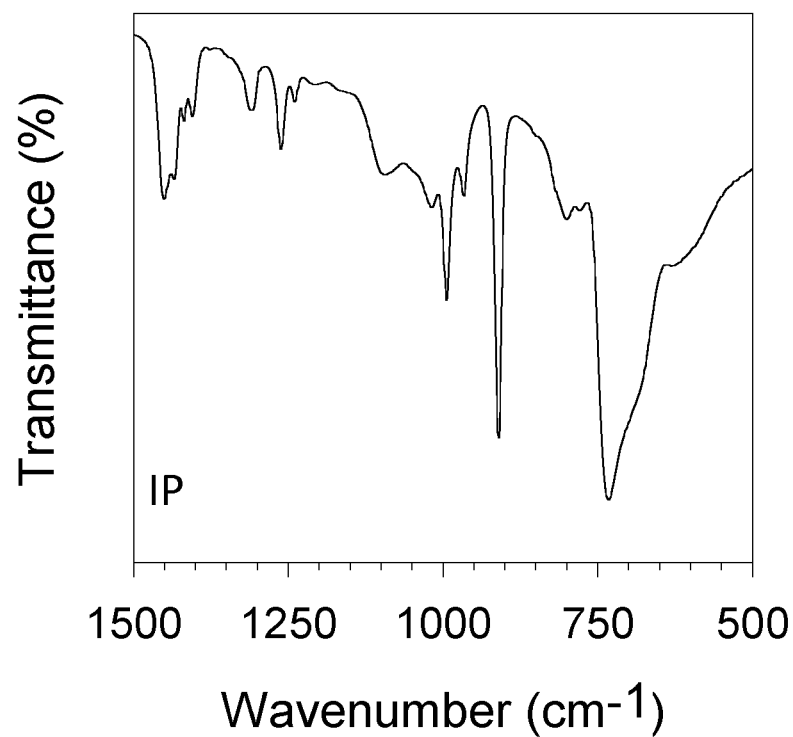
FIG. 23 shows the FT-IR spectrum of the polybutadiene obtained in Example 27.

FIG. 23 shows the FT-IR spectrum of the polybutadiene obtained.

FIG. 24 shows the GPC diagram of the polybutadiene obtained.

Figure 25:
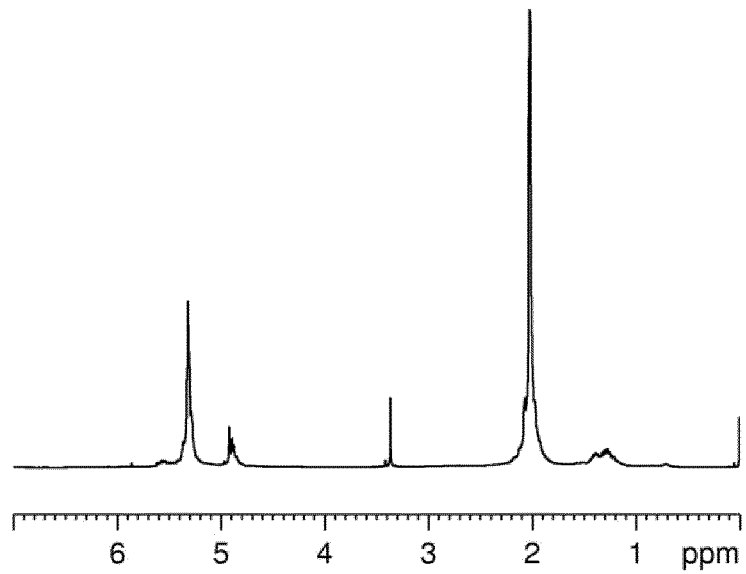
FIG. 25 shows the ¹H-NMR (bottom) and ¹³C-NMR (top) spectra of the polybutadiene obtained in Example 27.

FIG. 25 shows the $^1$H-NMR (bottom) and $^{13}$C-NMR (top) spectra of the polybutadiene obtained.

Example 28 (IP4)

2 ml of 1,3-butadiene equal to about 1.4 g were condensed, cold (−20° C.) in a 25 ml test tube. Subsequently, 7.0 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_2$(L6)$_2$ complex [sample GT-347] (2.76 ml of toluene suspension at a concentration equal to 2 mg/ml; 1×10$^{-5}$ moles, equal to about 5.52 mg) obtained as described in Example 18. The whole was kept under magnetic stirring, at 20° C., for 1350 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.239 g of polybutadiene with a prevalently 1,4-cis structure having a 1,4-cis unit content equal to 86.0%: further characteristics of the procedure and of the polybutadiene obtained are reported in Table 1.

Figure 26:
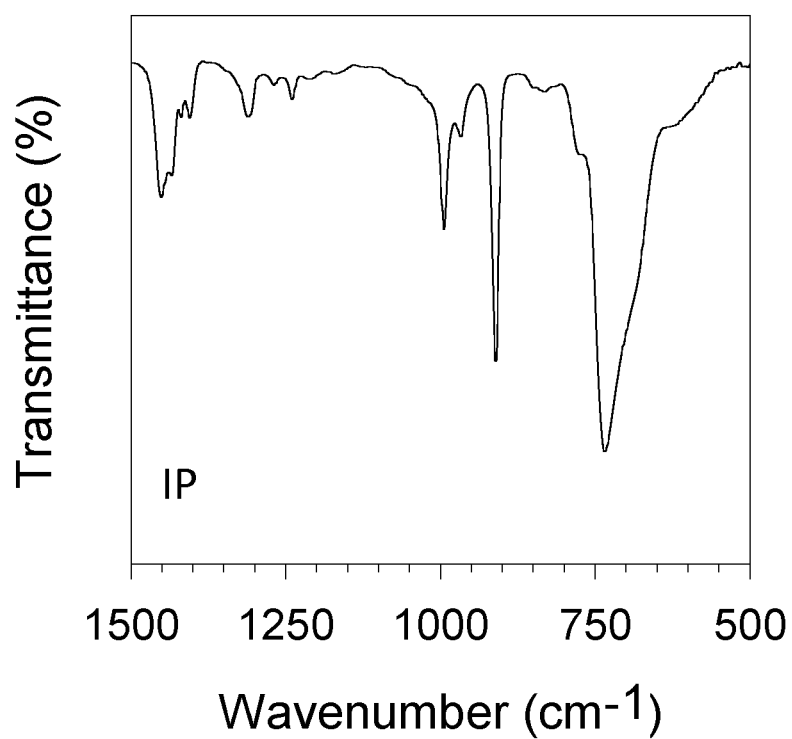
FIG. 26 shows the FT-IR spectrum of the polybutadiene obtained in Example 28.

FIG. 26 shows the FT-IR spectrum of the polybutadiene obtained.

Example 29 (IP7)

2 ml of 1,3-butadiene equal to about 1.4 g were condensed, cold (−20° C.) in a 25 ml test tube. Subsequently, 6.5 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_2$(L7)$_2$ complex [sample GT-348] (3.19 ml of toluene suspension at a concentration equal to 2 mg/ml; 1×10$^{-5}$ moles, equal to about 6.38 mg) obtained as described in Example 19. The whole was kept under magnetic stirring, at 20° C., for 3900 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.252 g of polybutadiene with a prevalently 1,4-cis structure having a 1,4-cis unit content equal to 85.3%: further characteristics of the procedure and of the polybutadiene obtained are reported in Table 1.

Figure 27:
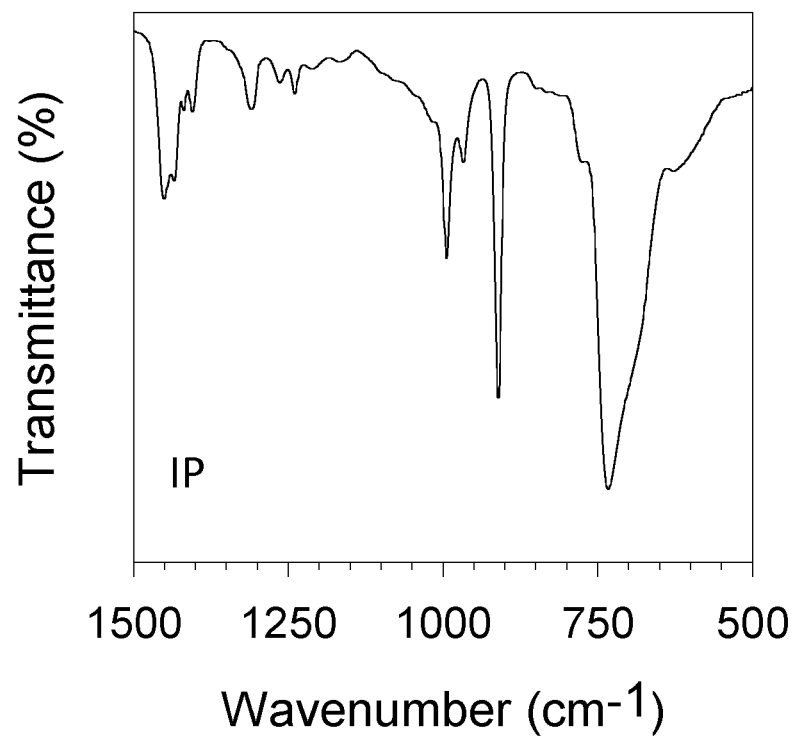
FIG. 27 shows the FT-IR spectrum of the polybutadiene obtained in Example 29.

FIG. 27 shows the FT-IR spectrum of the polybutadiene obtained.

Example 30 (GR001)

2 ml of isoprene equal to about 1.36 g were placed in a 25 ml test tube. Subsequently, 7.5 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_4$(L2) complex [sample BM2-211] (2.18 ml of toluene suspension at a concentration equal to 2 mg/ml; 1×10$^{-5}$ moles, equal to about 4.36 mg) obtained as described in Example 9. The whole was kept under magnetic stirring, at 20° C., for 300 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.289 g of polyisoprene with a mixed structure having a 1,4-cis unit content equal to 57.1% and a 3,4 unit content equal to 42.9%: further characteristics of the procedure and of the polyisoprene obtained are reported in Table 2.

Example 31 (GR002)

2 ml of isoprene equal to about 1.36 g were placed in a 25 ml test tube. Subsequently, 7.4 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_3$(L1) complex [sample BM2-227] (2.32 ml of toluene suspension at a concentration equal to 2 mg/ml; 1×10$^{-5}$ moles, equal to about 4.64 mg) obtained as described in Example 11. The whole was kept under magnetic stirring, at 20° C., for 30 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.757 g of polyisoprene with a mixed structure having a 1,4-cis unit content equal to 56.5% and a 3,4 unit content equal to 43.5%: further characteristics of the procedure and of the polyisoprene obtained are reported in Table 2.

Example 32 (G1113)

2 ml of isoprene equal to about 1.36 g were placed in a 25 ml test tube. Subsequently, 8.02 ml of toluene were added and the temperature of the solution thus obtained was brought to 20° C. Then, methylaluminoxane (MAO) in toluene solution (6.3 ml; 1×10$^{-2}$ moles, equal to about 0.58 g) was added and, subsequently, the TiCl$_3$(L4) complex [sample MT-11] (1.68 ml of toluene suspension at a concentration equal to 2 mg/ml; 1×10$^{-5}$ moles, equal to about 3.36 mg) obtained as described in Example 12. The whole was kept under magnetic stirring, at 20° C., for 100 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.214 g of polyisoprene with a mixed structure having a 1,4-cis unit content equal to 55.2% and a 3,4 unit content equal to 44.8%: further characteristics of the procedure and of the polyisoprene obtained are reported in Table 2.

Figure 28:
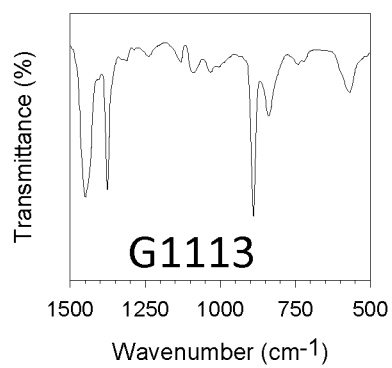
FIG. 28 shows the FT-IR spectrum of the polyisoprene obtained in Example 32.

FIG. 28 shows the FT-IR spectrum of the polyisoprene obtained.

Figure 29:
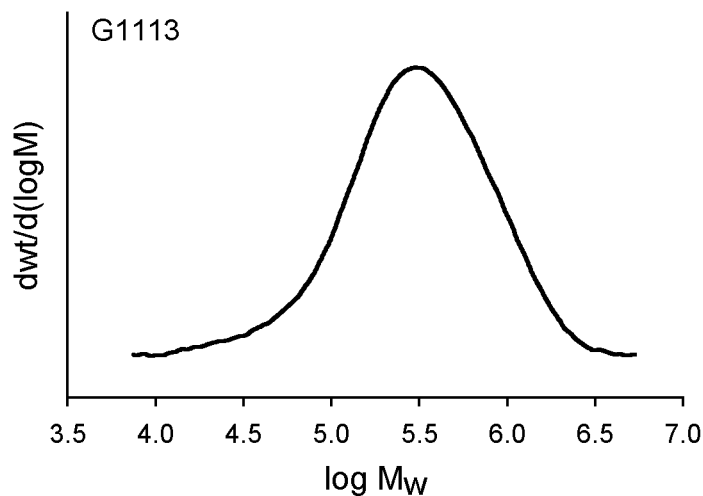
FIG. 29 shows the GPC diagram of the polyisoprene obtained in Example 32.

FIG. 29 shows the GPC diagram of the polyisoprene obtained.

Example 33 (G1114)

2 ml of isoprene equal to about 1.36 g were placed in a 25 ml test tube. Subsequently, 8.02 ml of toluene were added and the temperature of the solution thus obtained was brought to 20° C. Then, methylaluminoxane (MAO) in toluene solution (6.3 ml; 1×10⁻² moles, equal to about 0.58 g) was added and, subsequently, the TiCl$_3$(L3) complex [sample MT-27] (2.04 ml of toluene suspension at a concentration equal to 2 mg/ml; 1×10⁻⁵ moles, equal to about 4.08 mg) obtained as described in Example 13. The whole was kept under magnetic stirring, at 20° C., for 200 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.197 g of polyisoprene with a mixed structure having a 1,4-cis unit content equal to 55.9% and a 3,4 unit content equal to 44.1%: further characteristics of the procedure and of the polyisoprene obtained are reported in Table 2.

Figure 30:
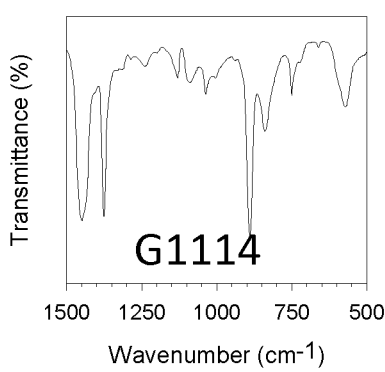
FIG. 30 shows the FT-IR spectrum of the polyisoprene obtained in Example 33.

FIG. 30 shows the FT-IR spectrum of the polyisoprene obtained.

Figure 31:
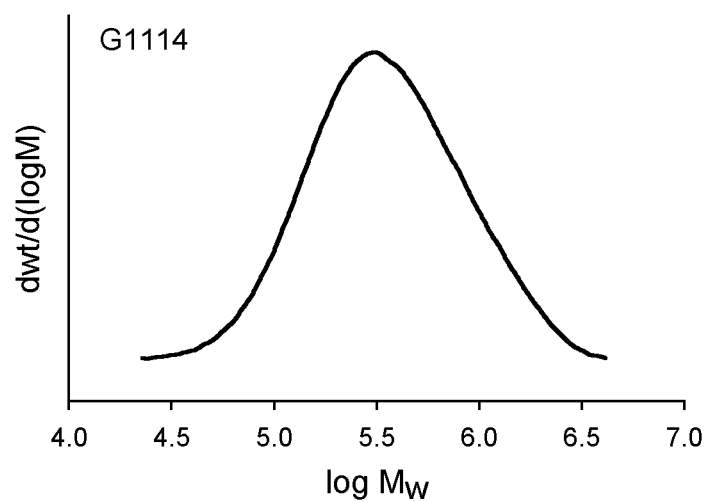
FIG. 31 shows the GPC diagram of the polyisoprene obtained in Example 33.

FIG. 31 shows the GPC diagram of the polyisoprene obtained.

Example 34 (IP26)

2 ml of isoprene equal to about 1.36 g were placed in a 25 ml test tube. Subsequently, 7.9 ml of toluene were added and the temperature of the solution thus obtained was brought to 20° C. Then, methylaluminoxane (MAO) in toluene solution (6.3 ml; 1×10⁻² moles, equal to about 0.58 g) was added and, subsequently, the TiCl$_3$(L5) complex [sample MT-32](1.83 ml of toluene suspension at a concentration equal to 2 mg/ml; 1×10⁻⁵ moles, equal to about 3.66 mg) obtained as described in Example 14. The whole was kept under magnetic stirring, at 20° C., for 150 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.811 g of polyisoprene with a mixed structure having a 1,4-cis unit content equal to 31.5% and a 3,4 unit content equal to 68.5%: further characteristics of the procedure and of the polyisoprene obtained are reported in Table 2.

Figure 32:
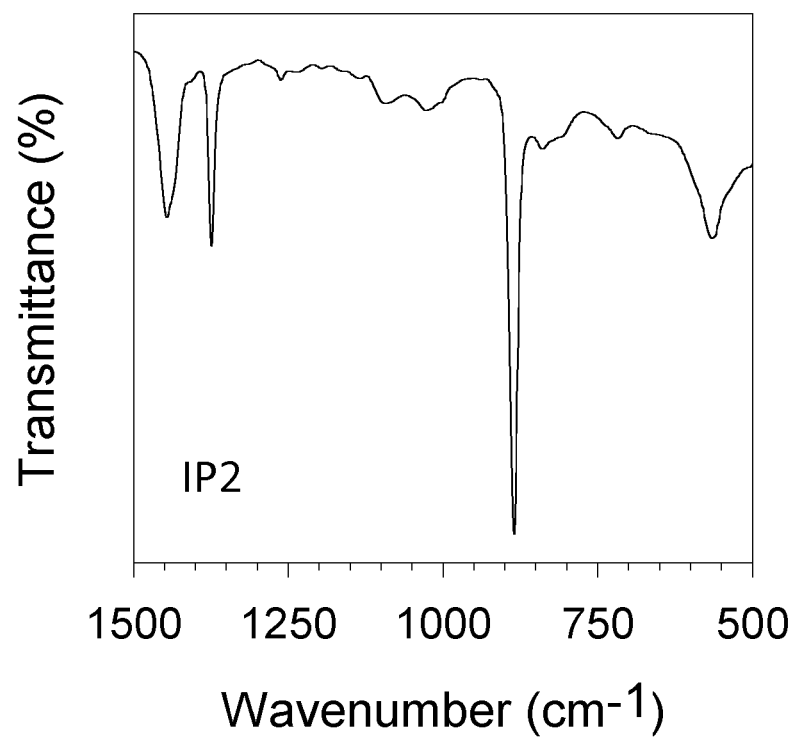
FIG. 32 shows the FT-IR spectrum of the polyisoprene obtained in Example 34.

FIG. 32 shows the FT-IR spectrum of the polyisoprene obtained.

Figure 33:
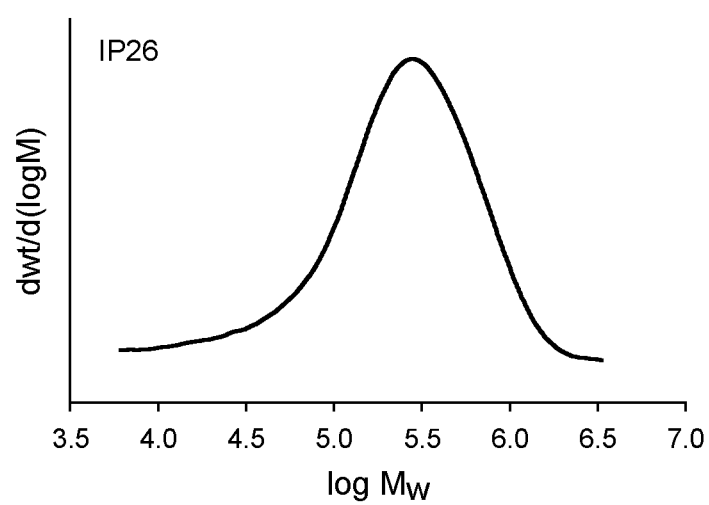
FIG. 33 shows the GPC diagram of the polyisoprene obtained in Example 34.

FIG. 33 shows the GPC diagram of the polyisoprene obtained.

Figure 34:
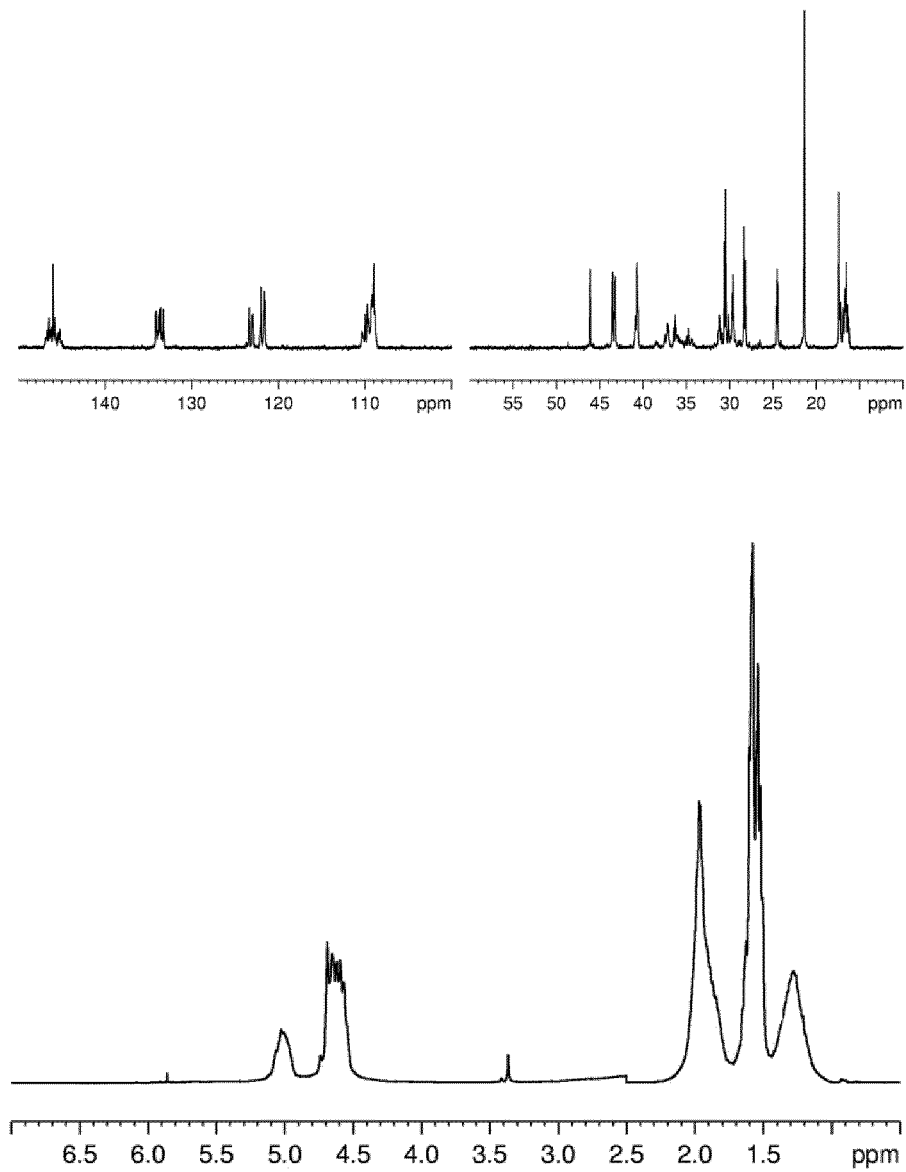
FIG. 34 shows the ¹H-NMR (bottom) and ¹³C-NMR (top) spectra of the polyisoprene obtained in Example 34.

FIG. 34 shows the ¹H-NMR (bottom) and ¹³C-NMR (top) spectra of the polyisoprene obtained.

Example 35 (G1089)

2 ml of isoprene equal to about 1.36 g were placed in a 25 ml test tube. Subsequently, 7.77 ml of toluene were added and the temperature of the solution thus obtained was brought to 20° C. Then, methylaluminoxane (MAO) in toluene solution (6.3 ml; 1×10⁻² moles, equal to about 0.58 g) was added and, subsequently, the TiCl$_2$(THF)(L1) complex [sample MT-22] (1.89 ml of toluene suspension at a concentration equal to 2 mg/ml; 1×10⁻⁵ moles, equal to about 3.78 mg) obtained as described in Example 15. The whole was kept under magnetic stirring, at 20° C., for 165 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1.050 g of polyisoprene with a mixed structure having a 1,4-cis unit content equal to 39.4% and a 3,4 unit content equal to 61.6%: further characteristics of the procedure and of the polyisoprene obtained are reported in Table 2.

Figure 35:
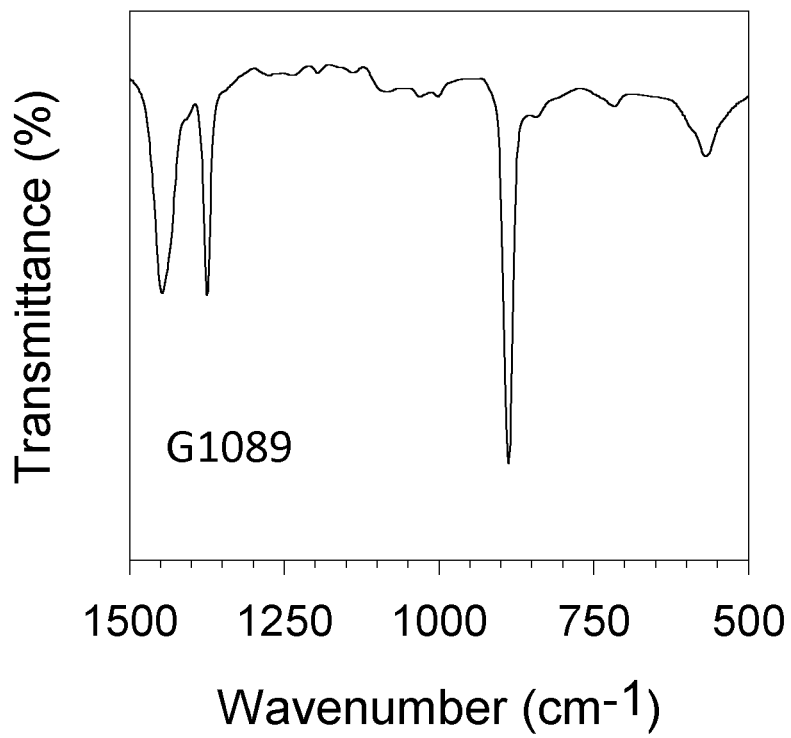
FIG. 35 shows the FT-IR spectrum of the polyisoprene obtained in Example 35.

FIG. 35 shows the FT-IR spectrum of the polyisoprene obtained.

Figure 36:
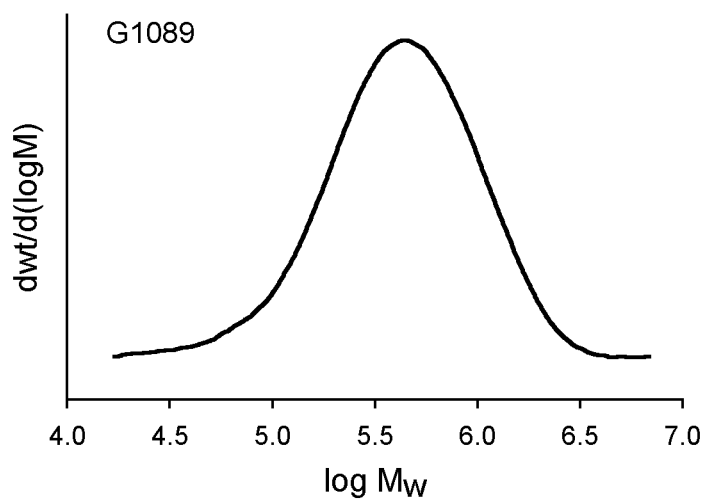
FIG. 36 shows the GPC diagram of the polyisoprene obtained in Example 35.

FIG. 36 shows the GPC diagram of the polyisoprene obtained.

Figure 37:
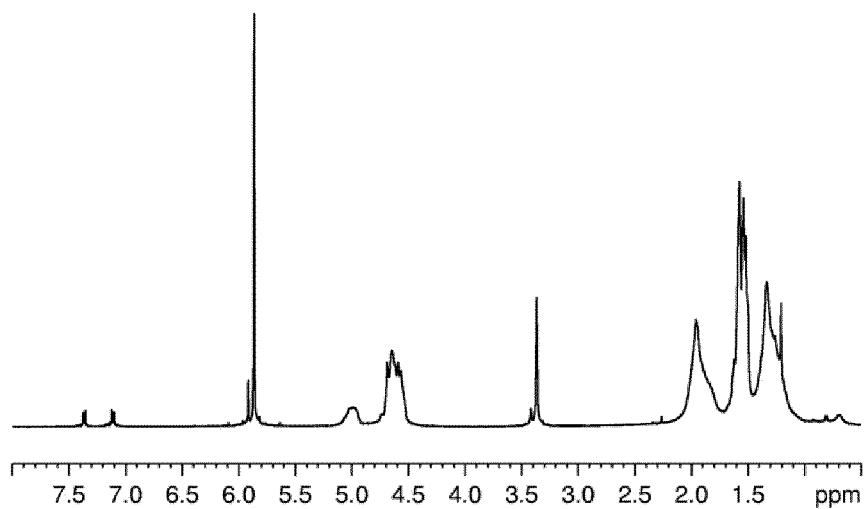
FIG. 37 shows the ¹H-NMR spectrum of the polyisoprene obtained in Example 35.

FIG. 37 shows the ¹H-NMR spectrum of the polyisoprene obtained.

TABLE 1

Polymerization of 1,3-butadiene with catalytic systems comprising titanium complexes

| Example | Time (min) | Yield (g) | Conversion (%) | 1,4-cis (%) | $M_w$ (g × mol⁻¹) | $M_w/M_n$ |
|---|---|---|---|---|---|---|
| 20 | 60 | 0.270 | 19.3 | 82.2 | 285700 | 2.1 |
| 21 | 7 | 0.601 | 42.9 | 82.5 | 314600 | 2.0 |
| 22 | 65 | 0.719 | 51.4 | 87.1 | 305400 | 2.0 |
| 23 | 135 | 0.562 | 40.1 | 81.2 | 535800 | 1.9 |
| 24 | 7 | 0.424 | 30.3 | 84.1 | 654771 | 1.8 |
| 25 | 5 | 1.4 | 100 | 84.4 | 745300 | 2.1 |
| 26 | 1080 | 0.294 | 21 | 81.1 | 81200 | 1.8 |
| 27 | 1080 | 0.379 | 27 | 82.2 | 111600 | 2.0 |
| 28 | 1350 | 0.239 | 17 | 86.0 | 43800 | 1.9 |
| 29 | 3900 | 0.252 | 18 | 85.3 | 57900 | 1.7 |

TABLE 2

Polymerization of isoprene with catalytic systems comprising titanium complexes

| Example | Time (min) | Yield (g) | Conversion (%) | 1,4-cis/3,4 (%) | $M_w$ (g × mol⁻¹) | $M_w/M_n$ |
|---|---|---|---|---|---|---|
| 30 | 300 | 0.289 | 21.3 | 57.1/42.9 | 248500 | 2.2 |
| 31 | 30 | 0.757 | 55.7 | 56.5/43.5 | 267600 | 2.1 |
| 32 | 100 | 0.214 | 15.7 | 55.2/44.8 | 453800 | 2.4 |
| 33 | 200 | 0.197 | 14.5 | 55.9/44.1 | 497100 | 2.0 |
| 34 | 150 | 0.811 | 59.6 | 31.5/68.5 | 351200 | 2.8 |
| 35 | 165 | 1.05 | 77.9 | 39.4/61.6 | 575643 | 2.0 |

The invention claimed is:

1. A nitrogen titanium complex having general formula (I):

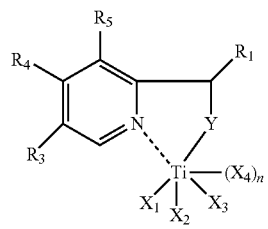

(I)

wherein:
R$_1$ represents a hydrogen atom; or is selected from linear or branched C$_1$-C$_{20}$ alkyl groups, optionally halogenated, cycloalkyl groups optionally substituted or aryl groups optionally substituted;

R$_2$, R$_3$, R$_4$ and R$_5$, identical or different, represent a hydrogen atom; or are selected from linear or branched C$_1$-C$_{20}$ alkyl groups, optionally halogenated, cycloalkyl groups optionally substituted, aryl groups optionally substituted, nitro groups, hydroxyl groups or amino groups;

Y represents a NH—$R_6$ group wherein $R_6$ represents a hydrogen atom, or is selected from linear or branched $C_1$-$C_{20}$ alkyl groups, optionally halogenated, cycloalkyl groups optionally substituted or aryl groups optionally substituted; or a N—$R_7$ group wherein $R_7$ is selected from linear or branched $C_1$-$C_{20}$ alkyl groups, optionally halogenated, cycloalkyl groups optionally substituted or aryl groups optionally substituted;

$X_1$, $X_2$, $X_3$ and $X_4$, identical or different, represent a halogen atom; or are selected from linear or branched $C_1$-$C_{20}$ alkyl groups, —$OCOR_8$ groups or groups —$OR_8$ wherein $R_8$ is selected from linear or branched $C_1$-$C_{20}$ alkyl groups; or one of $X_1$, $X_2$ and $X_3$ is selected from ethers; and n is 1 in the case wherein Y represents a NH—$R_6$ group wherein $R_6$ has the same meanings reported above; or n is 0 in the case wherein Y represents a N—$R_7$ group wherein $R_7$ has the same meanings reported above, or n is 0 in the case wherein one of $X_1$, $X_2$ and $X_3$ is selected from ethers.

2. The nitrogen titanium complex having general formula (I) according to claim 1, wherein:

$R_1$ represents a hydrogen atom; or is selected from $C_1$-$C_{20}$ alkyl groups;

$R_2$, $R_3$, $R_4$ and $R_5$, mutually identical, represent a hydrogen atom;

Y represents a NH—$R_6$ group or a N—$R_7$ group wherein $R_6$ and $R_7$ are selected from aryl groups optionally substituted;

$X_1$, $X_2$, $X_3$ and $X_4$, identical or different, represent a halogen atom; or one of $X_1$, $X_2$, $X_3$ is tetrahydrofuran (THF); and n is 1 in the case wherein Y represents a NH—$R_6$ group wherein $R_6$ has the same meanings reported above; or n is 0 in the case wherein Y represents a N—$R_7$ group wherein $R_7$ has the same meanings reported above, or n is 0 in the case wherein Y represents a N—$R_7$ group wherein $R_7$ has the same meanings reported above and one of $X_1$, $X_2$, $X_3$, is tetrahydrofuran.

3. A catalytic system for the (co)polymerization of conjugated dienes comprising:

(a) at least one nitrogen titanium complex having general formula (I) according to claim 1; and (b) at least one co-catalyst selected from organic compounds of an element M' different from carbon, said element M' belonging to groups 2, 12, 13, or 14, of the Periodic Table of the Elements, selected from: boron, aluminum, zinc, magnesium, gallium or tin.

4. A process for the (co)polymerization of conjugated dienes comprising providing said catalytic system of claim 3, providing conjugated dienes; and (co)polymerizing said conjugated dienes using said catalytic system.

5. A method for the (co)polymerization of conjugated dienes comprising:

providing conjugated dienes, providing a catalytic complex comprising at least one nitrogen titanium complex (a) and at least one co-catalyst (b), (a) wherein said at least one nitrogen titanium complex (a) has general formula (I) or (II);

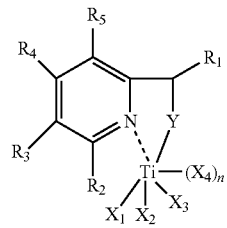

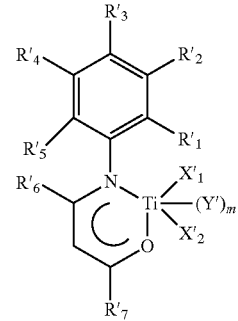

wherein:

$R_1$ represents a hydrogen atom; or is selected from linear or branched $C_1$-$C_{20}$ alkyl groups, optionally halogenated, cycloalkyl groups optionally substituted or aryl groups optionally substituted;

$R_2$, $R_3$, $R_4$ and $R_5$, identical or different, represent a hydrogen atom; or are selected from linear or branched $C_1$-$C_{20}$ alkyl groups, optionally halogenated, cycloalkyl groups optionally substituted, aryl groups optionally substituted, nitro groups, hydroxyl groups or amino groups;

Y represents a NH—$R_6$ group wherein $R_6$ represents a hydrogen atom, or is selected from linear or branched $C_1$-$C_{20}$ alkyl groups, optionally halogenated, cycloalkyl groups optionally substituted or aryl groups optionally substituted; or a N—$R_7$ group wherein $R_7$ is selected from linear or branched $C_1$-$C_{20}$ alkyl groups, optionally halogenated, cycloalkyl groups optionally substituted or aryl groups optionally substituted;

$X_1$, $X_2$, $X_3$ and $X_4$, identical or different, represent a halogen atom; or are selected from linear or branched $C_1$-$C_{20}$ alkyl groups, —$OCOR_8$ groups or groups —$OR_8$ wherein $R_8$ is selected from linear or branched $C_1$-$C_{20}$ alkyl groups; or one of $X_1$, $X_2$ and $X_3$ is selected from ethers;

n is 1 in the case wherein Y represents a NH—$R_6$ group wherein $R_6$ has the same meanings reported above; or n is 0 in the case wherein Y represents a N—$R_7$ group wherein $R_7$ has the same meanings reported above, or n is 0 in the case wherein one of $X_1$, $X_2$ and $X_3$ is selected from ethers;

$R'_1$, $R'_2$, $R'_3$, $R'_4$, $R'_5$, $R'_6$ and $R'_7$, identical or different, represent a hydrogen atom; or are selected from linear or branched $C_1$-$C_{20}$ alkyl groups, optionally halogenated, cycloalkyl groups optionally substituted or aryl groups optionally substituted;

$X'_2$ and $X'_2$, identical or different, represent a halogen atom; or are selected from linear or branched $C_1$-$C_{20}$ alkyl groups, —$OCOR'_8$ groups or —$OR'_8$ groups wherein $R_8$ is selected from linear or branched $C_1$-$C_{20}$ alkyl groups;

Y' is selected from ethers; or Y' represents a group having general formula (III):

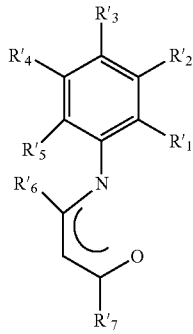

wherein R'$_1$, R'$_2$, R'$_6$, and R'$_7$, have the same meanings as reported above; and m is 0 or 1; and (b) wherein said at least one co-catalyst (b) includes from organic compounds of an element M' different from carbon, said element M' belongs to groups 2, 12, 13, or 14, of the Periodic Table of the Elements, and is selected from: boron, aluminum, zinc, magnesium, gallium or tin;

wherein said co-catalyst (b) is selected from co-catalyst (b$_1$), (b$_2$) or (b$_3$), wherein said co-catalyst (b$_1$) is selected from aluminum alkyls having general formula (IV):

$$Al(X_a)_n(R_a)_{3-p} \qquad (IV)$$

wherein $X_a$ represents a halogen atom; $R_a$ is selected from linear or branched $C_1$-$C_{20}$ alkyl groups, cycloalkyl groups or aryl groups, said groups being optionally substituted with one or more atoms of silicon or germanium; and p is an integer ranging from 0 to 2;

wherein said co-catalyst (b$_2$) includes organo-oxygenated compounds of an element M' different from carbon belonging to groups 13 or 14 of the Periodic Table of the Elements, selected from compounds of aluminum, gallium, or tin; and wherein said co-catalyst (b$_3$) includes compounds or mixtures of organometallic compounds of an element M' different from carbon able to react with the nitrogen titanium complex having general formula (I) or (II), by extracting from it a σ-linked substituent $X_1$, $X_2$ or $X_3$, to form at least one neutral compound or an ionic compound including a cation including the metal (Ti) coordinated by the ligand, and a non-coordinating organic anion including the metal M', whose negative charge is delocalized on a multicenter structure; and (co)polymerizing said conjugated dienes using said catalytic system.

6. A method for the (co)polymerization of conjugated dienes according to claim 5, wherein said co-catalyst (b$_1$) including said aluminum alkyls having general formula (IV) are tri-ethyl-aluminum or tri-iso-butyl-aluminum (TIBA).

7. A method for the (co)polymerization of conjugated dienes according to claim 5, wherein said co-catalyst (b$_2$) including said organo-oxygenated compounds are selected from aluminoxanes having general formula (V):

$$(R_9)_2-Al-O-[-Al(R_{10})-O-]_p-Al-(R_{11})_2 \qquad (V)$$

wherein $R_9$, $R_{10}$ and $R_{11}$, identical or different, represent a hydrogen atom, a halogen atom; or are selected from linear or branched $C_1$-$C_{20}$ alkyl groups, cycloalkyl groups or aryl groups, said groups being optionally substituted with one or more atoms of silicon or germanium; and p is an integer ranging from 0 to 1000.

8. A method for the (co)polymerization of conjugated dienes according to claim 7, wherein said co-catalyst (b$_2$) including said organo-oxygenated compound is methylaluminoxane.

9. A catalytic system for the (co)polymerization of conjugated dienes according to claim 5, wherein said co-catalyst (b$_3$) including said compounds or mixtures of compounds are selected from organic compounds of aluminum and boron represented by the following general formulae:

$$[(R_C)_wH_{4-w}]\cdot[B(R_D)_4]-; B(R_D)_3; Al(R_D)_3; B(R_D)_3Pir$$
$$[Ph_3C]^+\cdot[B(R_D)_4]-;$$

$$[(R_C)_3PirH]+\cdot[B(R_D)_4]-;$$

$$[Li]+\cdot[B(R_D)_4]-; [Li]+\cdot[Al(R_D)_4]-$$

wherein w is an integer ranging from 0 to 3, each $R_C$ group independently represents an alkyl group or an aryl group having from 1 to 10 carbon atoms and each $R_D$ group independently represents an aryl group partially or totally fluorinated, having from 6 to 20 carbon atoms, and Pir is a pyrrole radical optionally substituted.

10. A method for the (co)polymerization of conjugated dienes of claim 5 wherein said conjugated dienes include 1,3-butadiene or isoprene (2-methyl-1,3-butadiene).

* * * * *